(12) United States Patent
Zhou et al.

(10) Patent No.: US 10,973,034 B2
(45) Date of Patent: Apr. 6, 2021

(54) CONTROL RESOURCE SET MONITORING RULES BASED ON ACTIVE QUASI-CO-LOCATION ASSUMPTION CAPABILITIES OF A USER EQUIPMENT (UE)

(71) Applicant: QUALCOMM Incorporated, San Diego, CA (US)

(72) Inventors: Yan Zhou, San Diego, CA (US); Makesh Pravin John Wilson, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/681,508

(22) Filed: Nov. 12, 2019

(65) Prior Publication Data
US 2020/0154450 A1 May 14, 2020

Related U.S. Application Data

(60) Provisional application No. 62/767,500, filed on Nov. 14, 2018.

(51) Int. Cl.
| | | |
|---|---|---|
| *H04W 72/04* | (2009.01) | |
| *H04W 72/10* | (2009.01) | |
| *H04W 24/08* | (2009.01) | |
| *H04W 72/08* | (2009.01) | |
| *H04W 74/08* | (2009.01) | |

(52) U.S. Cl.
CPC .......... *H04W 72/10* (2013.01); *H04W 24/08* (2013.01); *H04W 72/0406* (2013.01); *H04W 72/085* (2013.01); *H04W 74/0833* (2013.01)

(58) Field of Classification Search
None
See application file for complete search history.

(56) References Cited

FOREIGN PATENT DOCUMENTS

WO WO-2018204282 A1 * 11/2018 ........... H04L 5/0023

OTHER PUBLICATIONS

International Search Report and Written Opinion—PCT/US2019/061219—ISA/EPO—dated Feb. 20, 2020.
(Continued)

*Primary Examiner* — Ayanah S George
(74) *Attorney, Agent, or Firm* — Holland & Hart LLP

(57) ABSTRACT

Methods, systems, and devices for wireless communications are described. In some systems, a base station may configure a user equipment (UE) with multiple control resource sets (CORESETs) for control channel monitoring. In some cases (e.g., based on a random access (RACH) procedure), the base station may update a CORESET with an updated downlink beam and, correspondingly, an updated active quasi-co-location (QCL) assumption for monitoring. In some cases, this updated active QCL assumption may cause the total number of active QCL assumptions to exceed a UE threshold value for monitoring. The UE may determine a priority order for monitoring the CORESETs, where the CORESET corresponding to the updated active QCL is assigned highest priority and the remaining CORESETs are prioritized based on CORESET or search space parameters, and the UE may either drop CORESETs from monitoring or modify active QCL assumptions for CORESETs based on the determined priority order.

30 Claims, 15 Drawing Sheets

(56) References Cited

OTHER PUBLICATIONS

LG Electronics: "Remaining Issues on PDCCH Structure", 3GPP Draft, 3GPP TSG RAN WG1 Meeting #93, R1-1806615, 3rd Generation Partnership Project (3GPP), Mobile Competence Centre, 650, Route Des Lucioles, F-06921 Sophia-Antipolis Cedex, France, vol. RAN WG1, No. Busan, Korea, 20180521-20180525, May 20, 2018 (May 20, 2018), pp. 1-4, XP051441817, Retrieved from the Internet: URL: http://www.3gpp.org/ftp/Meetings%5F3GPP%5FSYNC/RAN1/Docs/ [retrieved on May 20, 2018] section 2.1, proposal 1, last paragraph,section 2.2.

Mediatek Inc: "Views on Multi-CC QCL Assumptions", 3GPP Draft, 3GPP TSG RAN WG1 Meeting #93, R1-1806790, Simultaneous Reception V5, 3rd Generation Partnership Project (3GPP), Mobile Competence Centre, 650, Route Des Lucioles, F-06921, Sophia-Antipolis Cedex, France, vol. RAN WG1, No. Busan, Korea; 20180521-20180525, May 20, 2018 (May 20, 2018), XP051441992, 6 pages, Retrieved from the Internet: URL: http://www.3gpp.org/ftp/Meetings%5F3GPP%5FSYNC/RAN1/Docs/ [retrieved on May 20, 2018] section 2, third bullet point and following two paragraphs, section 3, table 1, line starting with PDDCH/CORESET+PDCCH/CORESET.

Qualcomm Incorporated: "Discussion on QCL", 3GPP Draft, 3GPP TSG RAN WG1 Meeting 90bis, R1-1718551, 3rd Generation Partnership Project (3GPP), Mobile Competence Centre, 650, Route Des Lucioles, F-06921 Sophia-Antipolis Cedex, France, vol. RAN WG1, No. Prague, Czech, 20171009-20171013, Oct. 8, 2017 (Oct. 8, 2017), XP051341732, 9 pages, Retrieved from the Internet: URL: https://www.3gpp.org/ftp/Meetings_3GPP_SYNC/RAN1/Docs/ [retrieved on Oct. 3, 2017], section 2.1;figure (a).

Vivo: "Remaining Issues on Beam Measurement and Reporting", 3GPP Draft; 3GPP TSG RAN WG1 Meeting #92, R1-1801520 Remaining Issues on Beam Measurement and Reporting, 3rd Generation Partnership Project (3GPP), Mobile Competence Centre, 650, Route Des Lucioles; F-06921 Sophia-Antipolis Cedex, France, vol. RAN WG1, No. Athens, Greece; 20180226-20180302, Feb. 15, 2018 (Feb. 15, 2018), 7 pages, XP051396772, Retrieved from the Internet: URL: http://www.3gpp.org/ftp/tsg_ran/WG1_RL1/TSGR1_92/Docs [retrieved on Feb. 15, 2018], Sections 1 and 2.2.1.

* cited by examiner

US 10,973,034 B2

CONTROL RESOURCE SET MONITORING RULES BASED ON ACTIVE QUASI-CO-LOCATION ASSUMPTION CAPABILITIES OF A USER EQUIPMENT (UE)

CROSS REFERENCE

The present Application for Patent claims the benefit of U.S. Provisional Patent Application No. 62/767,500 by Zhou et al., entitled "CONTROL RESOURCE SET MONITORING RULES BASED ON ACTIVE QUASI-CO-LOCATION ASSUMPTION CAPABILITIES OF A USER EQUIPMENT (UE)," filed Nov. 14, 2018, assigned to the assignee hereof, and expressly incorporated herein.

BACKGROUND

The following relates generally to wireless communications, and more specifically to control resource set (CORESET) monitoring rules based on active quasi-co-location (QCL) assumption capabilities of a user equipment (UE).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UE.

In some wireless communications systems, a base station may configure a UE with a number of CORESETs. Each CORESET may include one or more search spaces for the UE to monitor for downlink transmissions from the base station. The base station may transmit a physical downlink control channel (PDCCH) transmission in any of these search spaces, and the UE may blind decode the PDCCH transmission according to the configured search spaces and a QCL assumption for the transmission. However, in some cases, a base station may configure different CORESETs for a UE with different active QCL assumptions for downlink transmissions. If the number of active QCL assumptions for the configuration of the CORESETs is greater than a UE monitoring capability, the UE may not be able to monitor the search spaces in all of the configured CORESETs. As such, the UE may fail to detect downlink transmissions in one or more of the CORESETs based on the configured number of active QCL assumptions for the UE to monitor exceeding an active QCL monitoring threshold of the UE.

SUMMARY

The described techniques relate to improved methods, systems, devices, and apparatuses that support control resource set (CORESET) monitoring rules based on active quasi-co-location (QCL) assumption capabilities of a user equipment (UE). Generally, the described techniques provide for reliable physical downlink control channel (PDCCH) transmissions in monitoring occasions of CORESETs. In some wireless communications systems, a base station may configure a UE with multiple CORESETs and search spaces within each CORESET. In some cases (e.g., based on a random access (RACH) procedure or a medium access control (MAC) control element (CE)), the base station may update a CORESET with a different downlink beam and, correspondingly, an updated active QCL assumption for monitoring the updated CORESET. In some cases, this updated active QCL assumption may cause the total number of active QCL assumptions for the multiple configured CORESETs to exceed a threshold value (e.g., a UE capability) for the UE. The UE may determine a priority order for monitoring the CORESETs, where the CORESET corresponding to the updated active QCL is assigned highest priority and the remaining CORESETs are prioritized based on CORESET or search space parameters, and the UE may either drop CORESETs from monitoring or modify active QCL assumptions for CORESETs based on the determined priority order. The base station may transmit downlink transmissions (e.g., PDCCH transmissions) and the UE may monitor for the downlink transmissions according to the implemented CORESET monitoring rule (e.g., either dropping or QCL modification).

A method for wireless communication at a UE is described. The method may include identifying a configuration for a set of CORESETs, where the configuration for the set of CORESETs includes an updated active QCL assumption for a CORESET of the set of CORESETs, determining a priority order for monitoring the set of CORESETs, where the CORESET associated with the updated active QCL assumption corresponds to a highest priority of the priority order, and monitoring for downlink transmissions in at least a subset of the set of CORESETs based on the priority order and a number of active QCL assumptions for the set of CORESETs exceeding a threshold number of active QCL assumptions for the UE based on the updated active QCL assumption.

An apparatus for wireless communication at a UE is described. The apparatus may include a processor, memory in electronic communication with the processor, and instructions stored in the memory. The instructions may be executable by the processor to cause the apparatus to identify a configuration for a set of CORESETs, where the configuration for the set of CORESETs includes an updated active QCL assumption for a CORESET of the set of CORESETs, determine a priority order for monitoring the set of CORESETs, where the CORESET associated with the updated active QCL assumption corresponds to a highest priority of the priority order, and monitor for downlink transmissions in at least a subset of the set of CORESETs based on the priority order and a number of active QCL assumptions for the set of CORESETs exceeding a threshold number of active QCL assumptions for the UE based on the updated active QCL assumption.

Another apparatus for wireless communication at a UE is described. The apparatus may include means for identifying a configuration for a set of CORESETs, where the configuration for the set of CORESETs includes an updated active QCL assumption for a CORESET of the set of CORESETs, determining a priority order for monitoring the set of CORESETs, where the CORESET associated with the updated active QCL assumption corresponds to a highest priority of the priority order, and monitoring for downlink transmissions in at least a subset of the set of CORESETs based on the priority order and a number of active QCL assumptions for the set of CORESETs exceeding a threshold number of active QCL assumptions for the UE based on the updated active QCL assumption.

A non-transitory computer-readable medium storing code for wireless communication at a UE is described. The code may include instructions executable by a processor to identify a configuration for a set of CORESETs, where the configuration for the set of CORESETs includes an updated active QCL assumption for a CORESET of the set of CORESETs, determine a priority order for monitoring the set of CORESETs, where the CORESET associated with the updated active QCL assumption corresponds to a highest priority of the priority order, and monitor for downlink transmissions in at least a subset of the set of CORESETs based on the priority order and a number of active QCL assumptions for the set of CORESETs exceeding a threshold number of active QCL assumptions for the UE based on the updated active QCL assumption.

Some examples of the method, apparatuses, and non-transitory computer-readable medium described herein may further include operations, features, means, or instructions for transmitting, to a base station, a RACH preamble message indicating a downlink beam for the CORESET of the set of CORESETs, where the updated active QCL assumption for the CORESET may be based on the indicated downlink beam.

In some examples of the method, apparatuses, and non-transitory computer-readable medium described herein, monitoring for the downlink transmissions further may include operations, features, means, or instructions for monitoring for the downlink transmissions in a first subset of the set of CORESETs, where a number of active QCL assumptions for the first subset of the set of CORESETs may be less than or equal to the threshold number of active QCL assumptions for the UE and suppressing monitoring for a second subset of the set of CORESETs, where the second subset of the set of CORESETs corresponds to a set of lower priorities of the priority order than the first subset of the set of CORESETs.

In other examples of the method, apparatuses, and non-transitory computer-readable medium described herein, monitoring for the downlink transmissions further may include operations, features, means, or instructions for monitoring for the downlink transmissions in a first subset of the set of CORESETs, where a number of active QCL assumptions for the first subset of the set of CORESETs may be less than or equal to the threshold number of active QCL assumptions for the UE, modifying active QCL assumptions for a second subset of the set of CORESETs, where the second subset of the set of CORESETs corresponds to a set of lower priorities of the priority order than the first subset of the set of CORESETs, and where the modified active QCL assumptions include active QCL assumptions for the first subset of the set of CORESETs, and monitoring for the downlink transmissions in the second subset of the set of CORESETs according to the modified active QCL assumptions.

In some examples of the method, apparatuses, and non-transitory computer-readable medium described herein, the set of CORESETs includes the CORESET associated with the updated active QCL assumption and a set of additional CORESETs.

In some examples of the method, apparatuses, and non-transitory computer-readable medium described herein, determining the priority order for monitoring further may include operations, features, means, or instructions for determining the priority order for monitoring the set of additional CORESETs based on a CORESET identifier (ID) value for each CORESET of the set of additional CORESETs.

In some examples of the method, apparatuses, and non-transitory computer-readable medium described herein, determining the priority order for monitoring further may include operations, features, means, or instructions for determining the priority order for monitoring the set of additional CORESETs based on a monitoring period length for each CORESET of the set of additional CORESETs.

In some examples of the method, apparatuses, and non-transitory computer-readable medium described herein, determining the priority order for monitoring further may include operations, features, means, or instructions for determining the priority order for monitoring the set of additional CORESETs based on a reference signal received power associated with each CORESET of the set of additional CORESETs.

In some examples of the method, apparatuses, and non-transitory computer-readable medium described herein, determining the priority order for monitoring further may include operations, features, means, or instructions for determining the priority order for monitoring the set of additional CORESETs based on a type of search space associated with each CORESET of the set of additional CORESETs. In some examples of the method, apparatuses, and non-transitory computer-readable medium described herein, the type of search space includes either a common search space (CSS) or a UE-specific search space (UESS).

In some examples of the method, apparatuses, and non-transitory computer-readable medium described herein, determining the priority order for monitoring further may include operations, features, means, or instructions for determining the priority order for monitoring the set of additional CORESETs based on one or more search space IDs associated with each CORESET of the set of additional CORESETs.

In some examples of the method, apparatuses, and non-transitory computer-readable medium described herein, the downlink transmissions are examples of PDCCH transmissions.

A method of wireless communication at a base station is described. The method may include transmitting, to a UE, a configuration for a set of CORESETs, where the configuration for the set of CORESETs includes an updated active QCL assumption for a CORESET of the set of CORESETs, determining a priority order for the UE monitoring the set of CORESETs, where the CORESET associated with the updated active QCL assumption corresponds to a highest priority of the priority order, and transmitting a downlink transmission in a search space of a CORESET for transmission according to an active QCL assumption for the CORESET for transmission, where the CORESET for transmission, the active QCL assumption for the CORESET for transmission, or both are based on the priority order and a number of active QCL assumptions for the set of CORESETs exceeding a threshold number of active QCL assumptions for the UE based on the updated active QCL assumption.

An apparatus for wireless communication at a base station is described. The apparatus may include a processor, memory in electronic communication with the processor, and instructions stored in the memory. The instructions may be executable by the processor to cause the apparatus to transmit, to a UE, a configuration for a set of CORESETs, where the configuration for the set of CORESETs includes an updated active QCL assumption for a CORESET of the set of CORESETs, determine a priority order for the UE monitoring the set of CORESETs, where the CORESET associated with the updated active QCL assumption corresponds to a highest priority of the priority order, and transmit a downlink transmission in a search space of a CORESET for transmission according to an active QCL assumption for the CORESET for transmission, where the CORESET for transmission, the active QCL assumption for the CORESET for transmission, or both are based on the priority order and a number of active QCL assumptions for the set of CORESETs exceeding a threshold number of active QCL assumptions for the UE based on the updated active QCL assumption.

Another apparatus for wireless communication at a base station is described. The apparatus may include means for transmitting, to a UE, a configuration for a set of CORESETs, where the configuration for the set of CORESETs includes an updated active QCL assumption for a CORESET of the set of CORESETs, determining a priority order for the UE monitoring the set of CORESETs, where the CORESET associated with the updated active QCL assumption corresponds to a highest priority of the priority order, and transmitting a downlink transmission in a search space of a CORESET for transmission according to an active QCL assumption for the CORESET for transmission, where the CORESET for transmission, the active QCL assumption for the CORESET for transmission, or both are based on the priority order and a number of active QCL assumptions for the set of CORESETs exceeding a threshold number of active QCL assumptions for the UE based on the updated active QCL assumption.

A non-transitory computer-readable medium storing code for wireless communication at a base station is described. The code may include instructions executable by a processor to transmit, to a UE, a configuration for a set of CORESETs, where the configuration for the set of CORESETs includes an updated active QCL assumption for a CORESET of the set of CORESETs, determine a priority order for the UE monitoring the set of CORESETs, where the CORESET associated with the updated active QCL assumption corresponds to a highest priority of the priority order, and transmit a downlink transmission in a search space of a CORESET for transmission according to an active QCL assumption for the CORESET for transmission, where the CORESET for transmission, the active QCL assumption for the CORESET for transmission, or both are based on the priority order and a number of active QCL assumptions for the set of CORESETs exceeding a threshold number of active QCL assumptions for the UE based on the updated active QCL assumption.

Some examples of the method, apparatuses, and non-transitory computer-readable medium described herein may further include operations, features, means, or instructions for receiving, from the UE, a RACH preamble message indicating a downlink beam for the CORESET associated with the updated active QCL assumption, where the updated active QCL assumption for the CORESET may be based on the indicated downlink beam.

Some examples of the method, apparatuses, and non-transitory computer-readable medium described herein may further include operations, features, means, or instructions for selecting the CORESET for transmission from a first subset of the set of CORESETs, where a number of active QCL assumptions for the first subset of the set of CORESETs may be less than or equal to the threshold number of active QCL assumptions for the UE, and where the first subset of the set of CORESETs corresponds to a set of higher priorities of the priority order than a second subset of the set of CORESETs.

Other examples of the method, apparatuses, and non-transitory computer-readable medium described herein may further include operations, features, means, or instructions for selecting the CORESET for transmission from either a first subset of the set of CORESETs or a second subset of the set of CORESETs, where a number of active QCL assumptions for the first subset of the set of CORESETs may be less than or equal to the threshold number of active QCL assumptions for the UE, and where the first subset of the set of CORESETs corresponds to a set of higher priorities of the priority order than the second subset of the set of CORESETs. In some examples of the method, apparatuses, and non-transitory computer-readable medium described herein, the CORESET for transmission is selected from the second subset of the set of CORESETs. These examples of the method, apparatuses, and non-transitory computer-readable medium described herein may further include operations, features, means, or instructions for modifying the active QCL assumption for the CORESET for transmission, where the modified active QCL assumption for the CORESET for transmission includes an active QCL assumption for at least one CORESET of the first subset of the set of CORESETs.

In some examples of the method, apparatuses, and non-transitory computer-readable medium described herein, the set of CORESETs includes the CORESET associated with the updated active QCL assumption and a set of additional CORESETs. In some examples of the method, apparatuses, and non-transitory computer-readable medium described herein, determining the priority order for the UE monitoring further may include operations, features, means, or instructions for determining the priority order for the UE monitoring the set of additional CORESETs based on a CORESET ID value for each CORESET of the set of additional CORESETs, a monitoring period length for each CORESET of the set of additional CORESETs, a reference signal received power associated with each CORESET of the set of additional CORESETs, a type of search space associated with each CORESET of the set of additional CORESETs, one or more search space IDs associated with each CORESET of the set of additional CORESETs, or a combination thereof.

In some examples of the method, apparatuses, and non-transitory computer-readable medium described herein, the downlink transmission is an example of a PDCCH transmission.

DETAILED DESCRIPTION

Figure 1:
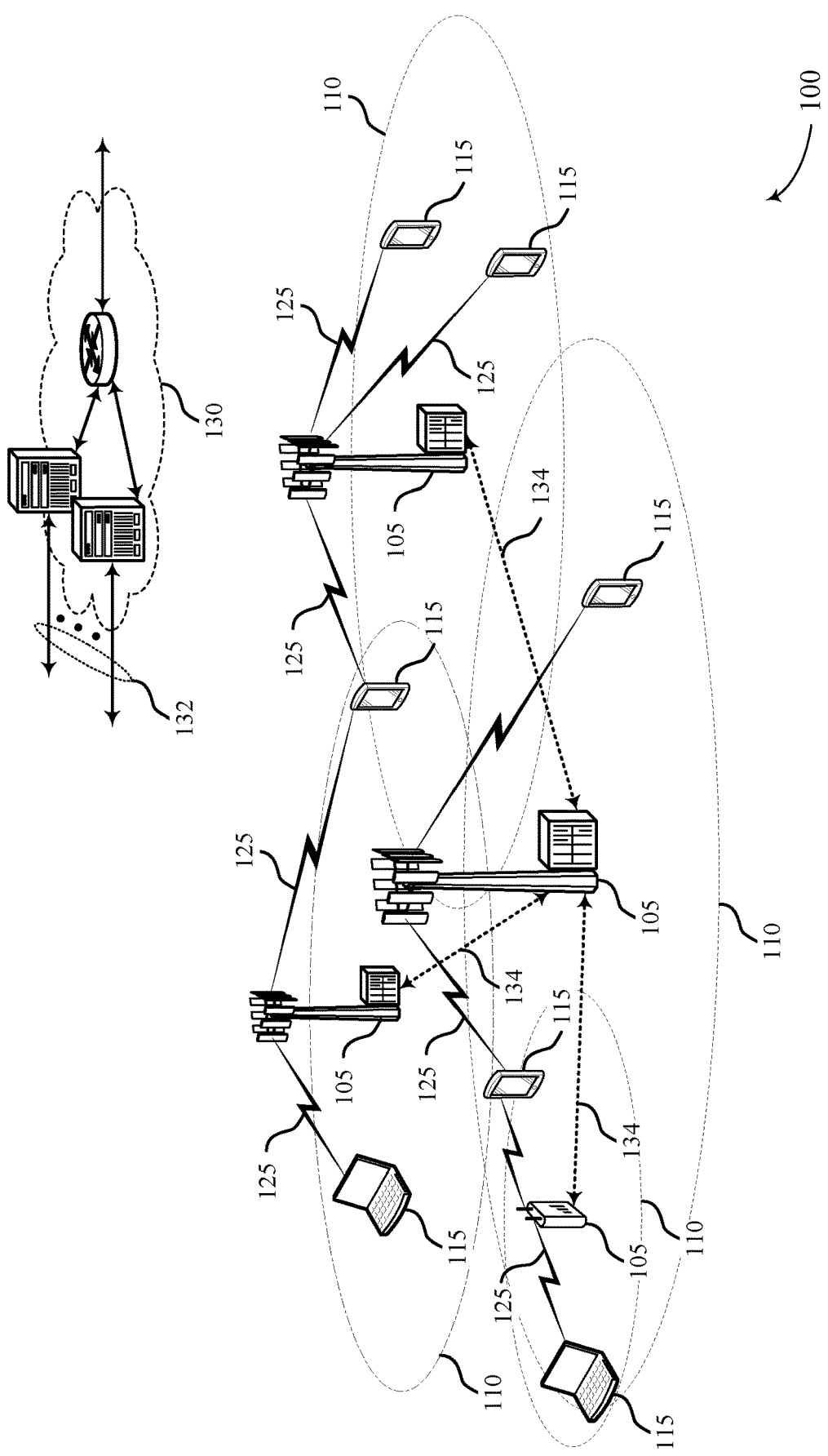
FIGS. 1 and 2 illustrate examples of wireless communications systems that support control resource set (CORESET) monitoring rules based on active quasi-co-location (QCL) assumption capabilities of a user equipment (UE) in accordance with aspects of the present disclosure.

In some wireless communications systems, a base station may configure a user equipment (UE) with multiple control resource sets (CORESETs) within a transmission time interval (TTI), such as a slot. Each CORESET may be configured with one or more search spaces, where the UE may monitor for downlink transmissions (e.g., physical downlink control channel (PDCCH) transmissions) in monitoring occasions within the search spaces. Each CORESET may be associated with a downlink beam, and the UE may monitor for the transmissions in a CORESET using an active quasi-co-location (QCL) assumption based on the downlink beam (e.g., where the active QCL may be indicated by a transmission configuration indicator (TCI) state). In some cases, the UE may have a threshold number of active QCL assumptions that the UE supports monitoring for in a TTI (e.g., in a same symbol, slot, subframe, etc.).

In some cases (e.g., based on a random access (RACH) procedure or a medium access control (MAC) control element (CE)), the base station may update a CORESET with a different downlink beam and, correspondingly, an updated active QCL assumption for monitoring the updated CORESET. In some examples, this updated active QCL assumption may cause the total number of active QCL assumptions for the multiple configured CORESETs to exceed the threshold number of active QCL assumptions for the UE (e.g., a maximum QCL capability of the UE). The UE may modify monitoring for the CORESETs based on the active number of QCL assumptions exceeding the UE capability.

For example, the UE, the base station, or both may determine a priority order for the UE to monitor the CORESETs, where the CORESET corresponding to the updated active QCL is assigned highest priority. The remaining CORESETs may be prioritized based on CORESET or search space parameters, such as CORESET identifier (ID) values, monitoring period lengths, reference signal power measurements, search space ID values, types of search spaces, or some combination of these or other relevant parameters. Based on the priority order, the UE may monitor for a first subset of the CORESETs with the highest priorities using the corresponding active QCL assumptions. For a second subset of the CORESETs with priorities lower than the first subset, the UE may either drop the CORESETs from monitoring or modify active QCL assumptions for the CORESETs to be shared with active QCL assumptions for CORESETS in the first subset. In this way, the UE may ensure that the number of active QCL assumptions for monitoring does not exceed the threshold number supported by the UE. Additionally, the base station may transmit downlink transmissions (e.g., PDCCH transmissions) according to the implemented CORESET monitoring rule (e.g., either dropping or QCL modification).

Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency wireless communications, among other examples, in accordance with identifying a configuration for a set of CORESETs, where the configuration includes an updated active QCL assumption for a CORESET. The described techniques may thus include features for improvements to power consumption, spectral efficiency, higher data rates and, in some examples, the described techniques may promote enhanced efficiency for high reliability and low latency operations, among other benefits.

Aspects of the disclosure are initially described in the context of wireless communications systems. Aspects of the disclosure are further illustrated by and described with reference to process flows, apparatus diagrams, system diagrams, and flowcharts that relate to CORESET monitoring rules based on active QCL assumption capabilities of a UE.

FIG. 1 illustrates an example of a wireless communications system 100 that supports CORESET monitoring rules based on active QCL assumption capabilities of a UE in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105, UEs 115, or both that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, a base station 105 may configure a UE 115 with multiple CORE-SETs within a TTI, such as a slot. Each CORESET may be configured with one or more search spaces, where the UE 115 may monitor for downlink transmissions (e.g., PDCCH transmissions) in monitoring occasions within the search spaces. Each CORESET may be associated with a downlink beam, and the UE 115 may monitor for the transmissions in a CORESET using an active QCL assumption based on the downlink beam (e.g., where the active QCL may be indicated by a TCI-state). In some cases, the UE 115 may have a threshold number of active QCL assumptions that the UE 115 supports monitoring for in a TTI (e.g., in a same symbol, slot, subframe, etc.).

In some cases (e.g., based on a RACH procedure), the base station 105 may update a CORESET with a different downlink beam and, correspondingly, an updated active QCL assumption for monitoring the updated CORESET. In some examples, this updated active QCL assumption may cause the total number of active QCL assumptions for the multiple configured CORESETs to exceed the threshold number of active QCL assumptions for the UE 115 (e.g., a maximum QCL capability of the UE 115). The UE 115 may modify monitoring for the CORESETs based on the active number of QCL assumptions exceeding the UE capability.

For example, the UE 115, the base station 105, or both may determine a priority order for the UE 115 to monitor the CORESETs, where the CORESET corresponding to the updated active QCL is assigned highest priority. The remaining CORESETs may be prioritized based on CORESET or search space parameters, such as CORESET ID values, monitoring period lengths, reference signal power measurements, search space ID values, types of search spaces, or some combination of these or other relevant parameters. Based on the priority order, the UE 115 may monitor for a first subset of the CORESETs with the highest priorities using the corresponding active QCL assumptions. For a second subset of the CORESETs with priorities lower than the first subset, the UE 115 may either drop the CORESETs from monitoring or modify active QCL assumptions for the CORESETs to be shared with active QCL assumptions for CORESETS in the first subset. In this way, the UE 115 may ensure that the number of active QCL assumptions for monitoring does not exceed the threshold number supported by the UE 115. Additionally, the base station 105 may transmit downlink transmissions (e.g., PDCCH transmissions) according to the implemented CORESET monitoring rule (e.g., either dropping or QCL modification).

Figure 2:
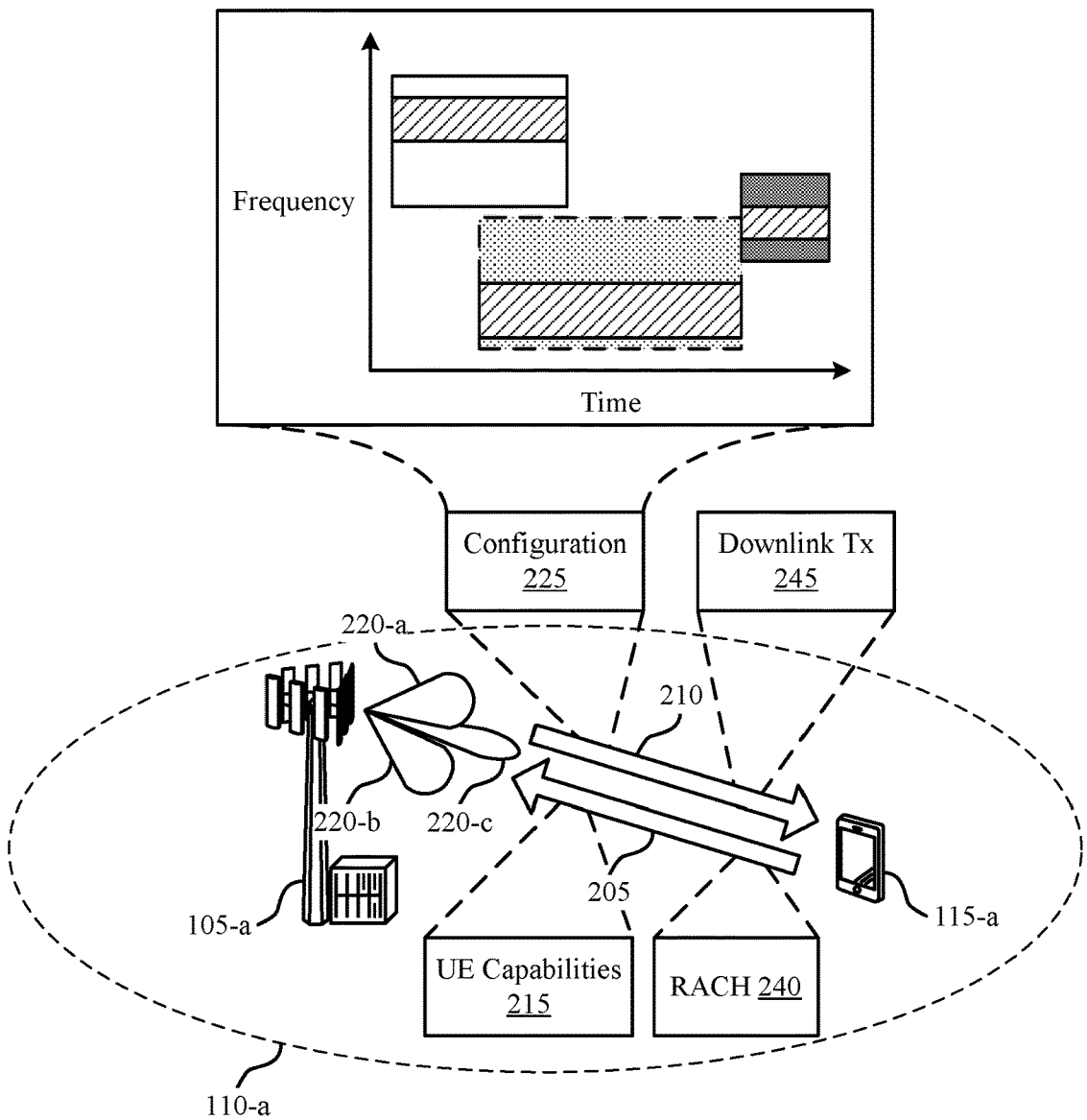

FIG. 2 illustrates an example of a wireless communications system 200 that supports CORESET monitoring rules based on active QCL assumption capabilities of a UE in accordance with aspects of the present disclosure. The wireless communications system 200 may include base station 105-*a* and UE 115-*a*, which may be examples of the corresponding devices described with reference to FIG. 1. Base station 105-*a* may provide network coverage for a geographic area 110-*a*. In some cases, base station 105-*a* may configure UE 115-*a* with multiple CORESETs 230 based on a configuration 225. For example, base station 105-*a* may configure UE 115-*a* with a number of CORESETs 230 (e.g., one, two, or three, etc.) per bandwidth part (BWP). UE 115-*a* may monitor the configured CORESETs 230 for downlink transmissions 245 from base station 105-*a*, such as PDCCH transmissions containing downlink control information (DCI) for UE 115-*a*. However, in some cases, different CORESETs 230 may correspond to different active QCL assumptions for monitoring. If, based on these active QCL assumptions for monitoring the CORESETs 230, UE 115-*a* is configured to monitor a number of active QCL assumptions greater than a threshold number of active QCL assumptions that UE 115-*a* is capable of monitoring, the UE 115-*a* may modify the CORESET monitoring procedure to support successful CORESET monitoring.

UE 115-*a* may monitor for PDCCH transmissions in multiple monitoring occasions within a transmission time interval (TTI) (e.g., a slot) to reduce the scheduling delay for control information. UE 115-*a* may be configured with one or more CORESETs 230 for receiving control information (e.g., DCI in PDCCH downlink transmissions 245). Each CORESET 230 may be associated with multiple search space sets 235. In some cases, base station 105-*a* may transmit a configuration 225 to UE 115-*a* to configure the CORESETs 230 and search space sets 235 for UE 115-*a*. This configuration 225 may be based on one or more UE capabilities 215 of UE 115-*a* (e.g., monitoring capabilities, processing capabilities, etc.). In some examples, UE 115-*a* may be configured with up to three CORESETs 230 per BWP. Each CORESET 230 may specify frequency resources (e.g., specific RBs) and a time span (e.g., a number of orthogonal frequency division multiplexing (OFDM) symbols, such as 1, 2, or 3 symbols) for the CORESET 230. Additionally, each CORESET 230 may be configured with either a narrowband demodulation reference signal (DMRS) (e.g., where the DMRSs are within the control channel elements (CCEs) used for monitoring candidates) or a wideband DMRS (e.g., where the DMRSs are over each entire CORESET or CORESET cluster that contains CCEs used for monitoring candidates).

Each CORESET 230 is associated with one or more search space sets 235. For example, for each BWP, UE 115-*a* may be configured with up to 10 search space sets 235. Each search space set 235 may be configured with a corresponding radio network temporary identifier (RNTI), DCI format, aggregation level (AL), type of search space (e.g., a common search space (CSS) or UE-specific search space (UESS)), periodicity, slot offset within the periodicity, bit sequence for monitoring (e.g., a 14-bit sequence indicating the symbols over which the search space set 235 is present), or some combination of these parameters. For a single CORESET 230, monitoring occasions for different search space sets 235 may not overlap (e.g., fully or partially) in time resources. However, search space sets 235 for different CORESETs 230 may fully or partially overlap in time.

For example, UE 115-*a* may transmit an indication of UE capabilities 215 to base station 105-*a* on an uplink channel 205. In some cases, when UE 115-*a* enters a connected mode with base station 105-*a*, base station 105-*a* may request the UE capabilities 215. These UE capabilities 215 may indicate a number of monitoring or processing capabilities of the UE 115-*a*. For example, one UE capability may indicate a total number of active transmission configuration indicator (TCI) states supported by UE 115-*a* for PDCCH and physical downlink shared channel (PDSCH) transmissions (e.g., 1, 2, 4, 8, etc.). Additionally or alternatively, UE 115-*a* may include a maximum supported number of configured TCI-states per component carrier (e.g., 4, 8, 16, 32, 64, 128, etc.) in the UE capabilities 215. UE 115-*a* may simultaneously monitor for and process a number of downlink beams 220 (e.g., for control information, data, or both) less than or equal to the threshold number of active TCI-states. This threshold number of supported TCI-states may include active QCL assumptions for monitoring. For example, active QCL assumptions may include downlink beams indicated by TCI-states and downlink beams not indicated by TCI-states (e.g., downlink beams selected in a random access (RACH) procedure or by a medium access control (MAC) control element (CE)). In this way, although base station 105-*a* may not indicate more TCI-states than the UE capability, the total number of active QCL assumptions for downlink beams may exceed the UE capability, as the threshold number of supported active QCL assumptions for monitoring may be the same as the maximum supported number of active TCI-states. If UE 115-*a* reports support for X active TCI-states, base station 105-*a* may configure (e.g., activate) UE 115-*a* with X active QCL assumptions for monitoring any PDSCHs and any CORESETs 230 for a given BWP (e.g., of a specific component carrier) of a serving cell (e.g., base station 105-*a*).

For example, base station 105-*a* may identify that UE 115-*a* supports two active DCI-states (and, correspondingly, two active QCL assumptions). Base station 105-*a* may transmit a configuration 225 (e.g., an initial configuration 225) on the downlink channel 210 to UE 115-*a* indicating a CORESET 230 configuration. This configuration 225 may configure UE 115-*a* with three CORESETs 230 (e.g., CORESET 230-a, CORESET 230-b, and CORESET 230-c). Based on the UE active QCL capability, base station 105-a may configure the three CORESETs 230 with two downlink beams 220 (e.g., downlink beam 220-a and downlink beam 220-b). For example, CORESET 230-a and CORESET 230-b may share a same downlink beam 220-a indicated by a first active TCI-state and CORESET 230-c may have a second downlink beam 220-b indicated by a second active TCI-state.

However, as discussed above, in some cases base station 105-a may update downlink beams such that the active number of QCL assumptions exceeds a capability of the UE 115-a. In some cases, this may occur during a beam failure/recovery procedure. For example, if base station 105-a or UE 115-a identifies a downlink beam 220 failure, the wireless devices may perform a RACH procedure to update the downlink beams 220. In these cases, UE 115-a may transmit a RACH preamble message 240 to base station 105-a indicating a downlink beam 220 (e.g., downlink beam 220-c). In some examples, base station 105-a may perform a beam sweep procedure, and UE 115-a may select a "best" downlink beam 220 (e.g., based on a beam quality of the downlink beam 220) from the beams used in the beam sweep, and may indicate this selected downlink beam 220 in the RACH preamble message 240. In some cases, UE 115-a may transmit the RACH preamble message 240 on an uplink beam corresponding to the selected downlink beam 220 in order to indicate the downlink beam 220. Based on the indicated downlink beam 220, base station 105-a may update a configuration 225 for UE 115-a. For example, base station 105-a may update the downlink beam 220 used for downlink transmissions 245 in a CORESET 230. In some cases, the RACH preamble message 240 may indicate the CORESET 230 to update with the indicated downlink beam 220. In other cases, base station 105-a may determine the CORESET 230 to update based on one or more parameters of the CORESET 230 (e.g., based on a unique CORESET identifier (ID)).

This updated downlink beam 220 for the CORESET 230 may correspond to an updated active QCL for downlink transmissions 245 in the CORESET 230. To indicate this updated active QCL to UE 115-a, base station 105-a may transmit a configuration 225 (e.g., an updated configuration 225) to UE 115-a indicating the updated active QCL assumption to use for monitoring the CORESET 230. In some cases, adding this updated active QCL assumption for monitoring to a set of active QCL assumptions for monitoring at UE 115-a may result in the number of active QCL assumptions for monitoring to exceed a threshold number of active QCL assumptions for UE 115-a (e.g., where the threshold number corresponds to the maximum capability of the UE 115-a). In this case, the UE 115-a, base station 105-a, or both may implement one or more CORESET monitoring rules to handle the active QCL number exceeding the UE capability. For example, UE 115-a may decide which CORESETs 230 with different active QCLs to monitor. Additionally or alternatively, UE 115-a may select a set of CORESETs 230, and may modify the monitoring for the remaining CORESETs 230 to use active QCLs for the selected CORESETs 230.

UE 115-a, base station 105-a, or both may determine a priority order for monitoring the configured CORESETs 230. For example, UE 115-a may prioritize the CORESET updated with the updated active QCL assumption (e.g., the CORESET 230 updated based on the RACH preamble message 240). UE 115-a may determine the priority order for the remaining CORESETs 230 based on one or more CORESET 230 or search space parameters. In a first example, UE 115-a may prioritize the remaining CORESETs 230 based on CORESET ID values. UE 115-a may either assign higher priority to CORESETs 230 with lower ID values or may assign higher priority to CORESETs 230 with higher ID values. In a second example, UE 115-a may prioritize the remaining CORESETs 230 based on monitoring period lengths for the CORESETs 230. For example, UE 115-a may either assign higher priority to CORESETs 230 with shorter monitoring periods or may assign higher priority to CORESETs 230 with longer monitoring periods. In a third example, UE 115-a my prioritize the remaining CORESETs 230 based on reference signal powers associated with each of the CORESETs 230 (or associated with the downlink beams 220 for each of the CORESETs 230). For example, UE 115-a may assign higher priority to CORESETs 230 with higher measured signal-to-noise ratio (SNR) values. In a fourth example, UE 115-a may prioritize the remaining CORESETs 230 based on one or more search space IDs for search space sets 235 contained in the different CORESETs 230. In a fifth example, UE 115-a may prioritize the remaining CORESETs 230 based on the types of search spaces (e.g., whether the search spaces correspond to common search spaces (CSSs) or UE-specific search spaces (UESSs)). In some cases, UE 115-a may prioritize the remaining CORESETs 230 according to any combination of the above parameters or based on additional CORESET or search space-related parameters.

UE 115-a may monitor for the CORESETs 230 based on the determined priority order. In a first implementation, UE 115-a may use a dropping rule for CORESET 230 monitoring. In this implementation, UE 115-a may monitor for downlink transmissions 245 in a subset of the CORESETs 230 with highest priorities, where the number of different active QCL assumptions for the subset of the CORESETs 230 is less than or equal to the threshold number of active QCL assumptions for UE 115-a. UE 115-a may suppress monitoring for (i.e., drop) the remaining CORESETs 230 with different active QCL assumptions and with lower priority according to the determined priority order.

In a second implementation, UE 115-a may use a QCL modification rule for CORESET 230 monitoring. In this implementation, UE 115-a may similarly monitor for downlink transmissions 245 in the subset of the CORESETs 230 with highest priorities, where the number of different active QCL assumptions for the subset of the CORESETs 230 is less than or equal to the threshold number of active QCL assumptions for UE 115-a. UE 115-a may perform this monitoring according to the active QCL assumptions for these CORESETs 230. For the remaining CORESETs 230, rather than suppress monitoring, UE 115-a may use one or more active QCL assumptions for the subset of CORESETs 230 with highest priorities for monitoring for downlink transmissions 245 in these remaining CORESETs 230. In this way, UE 115-a may modify the active QCL assumptions for these remaining CORESETs 230 such that the total number of active QCL assumptions does not exceed the threshold number of active QCL assumptions for UE 115-a.

Base station 105-a may determine the same priority order as UE 115-a using a similar technique and may transmit downlink transmissions 245 based on the determined priority order. For example, base station 105-a may determine which CORESETs 230 UE 115-a is monitoring and may transmit a downlink transmission 245 (e.g., a PDCCH transmission) in one of the monitored CORESETs 230 according to an active QCL for that CORESET 230. In the first implementation, base station 105-a may refrain from transmitting the downlink transmission 245 in any CORE-SETs 230 dropped from UE 115 monitoring. In the second implementation, if base station 105-*a* transmits the downlink transmission 245 in a CORESET 230 being monitored using a modified active QCL assumption, base station 105-*a* may modify the downlink beam 220 for the CORESET 230 such that the active QCL used for the downlink transmission 245 matches the modified active QCL assumption.

For example, UE 115-*a* may transmit a RACH preamble message 240 to base station 105-*a* indicating downlink beam 220-*c*. Base station 105-*a* may update the downlink beam 220 for CORESET 230-*a* from downlink beam 220-*a* to downlink beam 220-*c* selected in the RACH procedure. Based on this updated downlink beam 220-*c*, and the corresponding updated active QCL assumption for this CORESET 230-*a*, the configuration 225 may not indicate three CORESETs 230 associated with three different downlink beams 220 and, correspondingly, three different active QCL assumptions. If UE 115-*a* has an active QCL assumption threshold of two, UE 115-*a* and base station 105-*a* may determine a priority order for the CORESETs 230. CORESET 230-*a* may be assigned highest priority based on the updated active QCL assumption corresponding to this CORESET 230-*a* (e.g., as specified in the RACH preamble message 240). The remaining CORESETs 230-*b* and 230-*c* may be prioritized based on one or more parameters of the CORESETs 230. For example, if prioritization is based on monitoring period length, CORESET 230-*c* may be assigned a higher priority than CORESET 230-*b* based on a shorter monitoring period. In this example, UE 115-*a* may either suppress monitoring for downlink transmissions 245 in CORESET 230-*b* or may monitor for downlink transmissions 245 in CORESET 230-*b* using an active QCL assumption for either CORESET 230-*a* or CORESET 230-*c*.

When determining the priority order, any CORESETs 230 with the same active QCL assumption may be grouped together at a same priority level. In some cases, UE 115-*a*, base station 105-*a*, or both may prioritize CORESETs 230 based on the number of CORESETs 230 sharing a same downlink beam 220 and, correspondingly, a same active QCL assumption.

Figure 3:
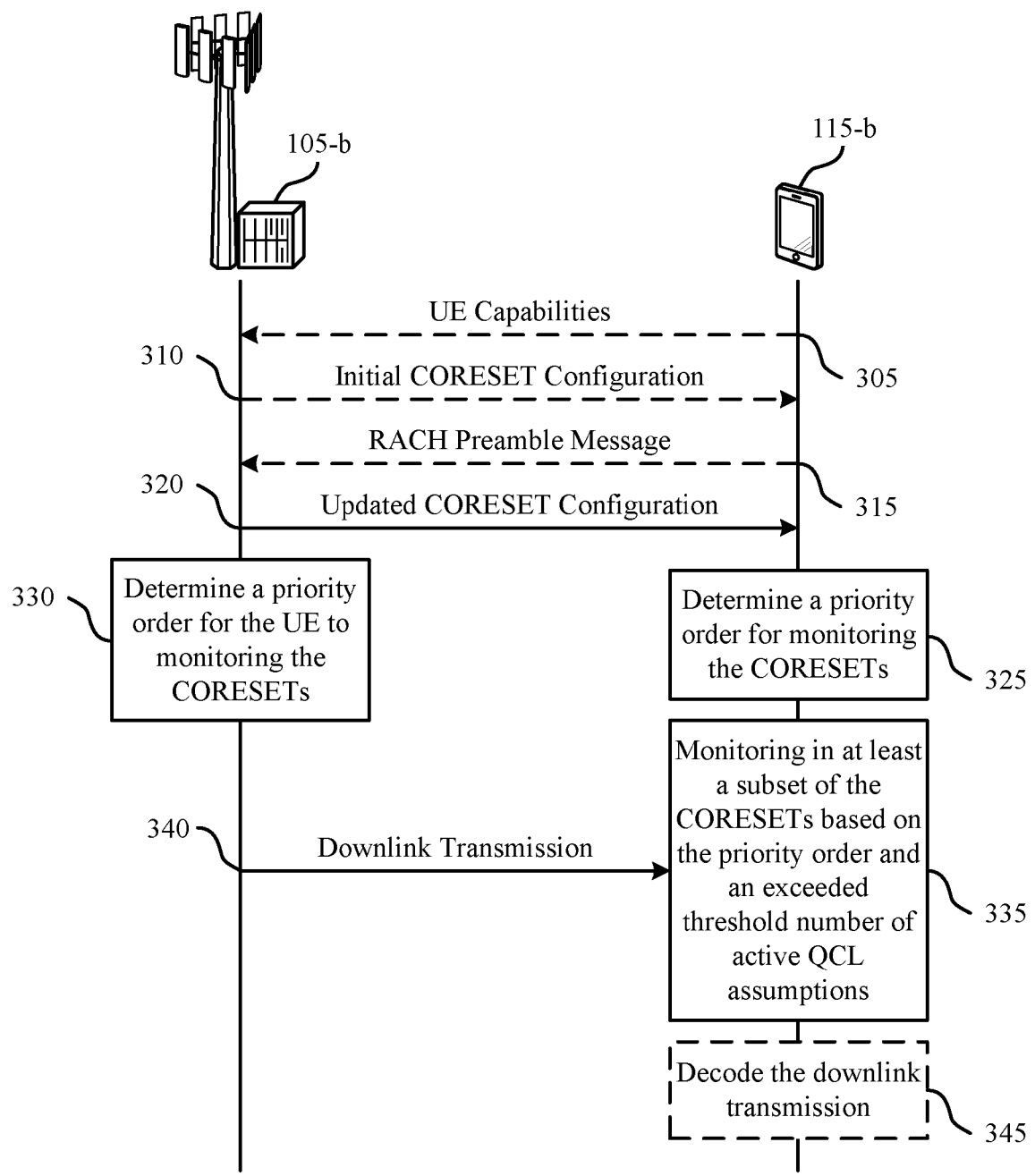
FIG. 3 illustrates an example of a process flow that supports CORESET monitoring rules based on active QCL assumption capabilities of a UE in accordance with aspects of the present disclosure.

FIG. 3 illustrates an example of a process flow 300 that supports CORESET monitoring rules based on active QCL assumption capabilities of a UE in accordance with aspects of the present disclosure. The process flow 300 may include base station 105-*b* and UE 115-*b*, which may be examples of the corresponding devices described with reference to FIGS. 1 and 2. Base station 105-*b* and UE 115-*b* may implement one or more techniques for determining CORESET monitoring priority for UE 115-*b*. If the wireless devices identify that a number of active QCL assumptions for UE 115-*a* to monitor is greater than a monitoring capability of UE 115-*a*, UE 115-*a* may modify its CORESET monitoring procedure and base station 105-*a* may select CORESET resources and transmission parameters for a PDCCH transmission according to this modified CORESET monitoring procedure. Alternative examples of the following may be implemented, where some steps are performed in a different order than described or are not performed at all. In some cases, steps may include additional features not mentioned below, or further steps may be added.

At 305, UE 115-*b* may transmit an indication of UE capabilities to base station 105-*a*. In some cases, these UE capabilities may include a maximum number of supported active TCI-states, a maximum number of supported configured TCI-states, or both. The maximum number of supported active TCI-states may be equivalent to a maximum number of active QCL assumptions supported by UE 115-*b* for monitoring. This value may be referred to as a threshold number of active QCL assumptions for the UE 115-*b*.

At 310, base station 105-*b* may transmit an initial CORESET configuration to UE 115-*b*. In this initial configuration, UE 115-*b* may be configured with a number of CORESETs such that the total number of active QCL assumptions (e.g., the total number of downlink beams for the CORESETs indicated in TCI-states) for the CORESETs is less than or equal to the threshold number of active QCL assumptions for the UE 115-*b*.

At 315, UE 115-*b* may transmit a RACH preamble message to base station 105-*b* indicating a downlink beam for a CORESET. In some cases, UE 115-*b* may transmit the RACH preamble message as part of a beam recovery procedure. UE 115-*b* may select the downlink beam to indicate in the RACH preamble message based on measuring beam qualities for a set of downlink beams included in a beam sweep.

At 320, base station 105-*b* may transmit a configuration of a set of CORESETs to UE 115-*b*, where the configuration includes an updated active QCL assumption for a CORESET. This updated active QCL assumption may be based on the updated downlink beam of the CORESET indicated in the RACH preamble message. In some cases, this configuration may be an example of an updated configuration.

At 325, UE 115-*b* may determine a priority order for monitoring the CORESETs, where the CORESET associated with the updated active QCL assumption is assigned the highest priority in the priority order. Any additional CORESETs in the set of CORESETs (i.e., the remaining CORESETs) may be prioritized based on any number of CORESET or search space parameters. For example, determining the priority order for the remaining CORESETs may be based on CORESET ID values, monitoring period lengths, reference signal received powers, search space types (e.g., CSSs or UESSs), search space ID values, or any combination of these or other relevant parameters. At 330, base station 105-*a* may similarly determine the UE 115-*b*'s monitoring priority order.

At 335, UE 115-*b* may monitor for downlink transmissions in at least a subset of the CORESETs based on the priority order. For example, UE 115-*b* may modify the CORESET monitoring based on a CORESET monitoring rule due to the number of active QCL assumptions for the CORESETs exceeding the threshold number of active QCL assumptions for the UE 115-*b*. The number of active QCL assumptions may exceed the threshold based on the updated active QCL assumption. In some cases, UE 115-*b* may monitor for downlink transmissions in a first subset of the CORESETs and may suppress monitoring for a second subset of the CORESETs, where the second subset contains CORESETS corresponding to lower priority values than the CORESETs in the first subset of CORESETs. In other cases, UE 115-*b* may monitor for downlink transmissions in both of these subsets, but may modify monitoring for the CORESETs in the second subset by modifying the active QCL assumptions for these CORESETs. By modifying the active QCL assumptions for these CORESETs to be shared with active QCL assumptions in the first subset, UE 115-*a* may monitor each of the CORESETs without exceeding the threshold number of active QCL assumptions for the UE 115-*b*.

At 340, base station 105-*b* may transmit a downlink transmission (e.g., a PDCCH transmission) to UE 115-*b* in a monitoring occasion of a search space of a configured CORESET. As base station 105-*b* determines the priority order, base station 105-*b* may transmit the downlink transmission such that UE 115-*b* may detect the transmission based on the modified monitoring. UE 115-*b* may decode the downlink transmission at 345.

Figure 4:
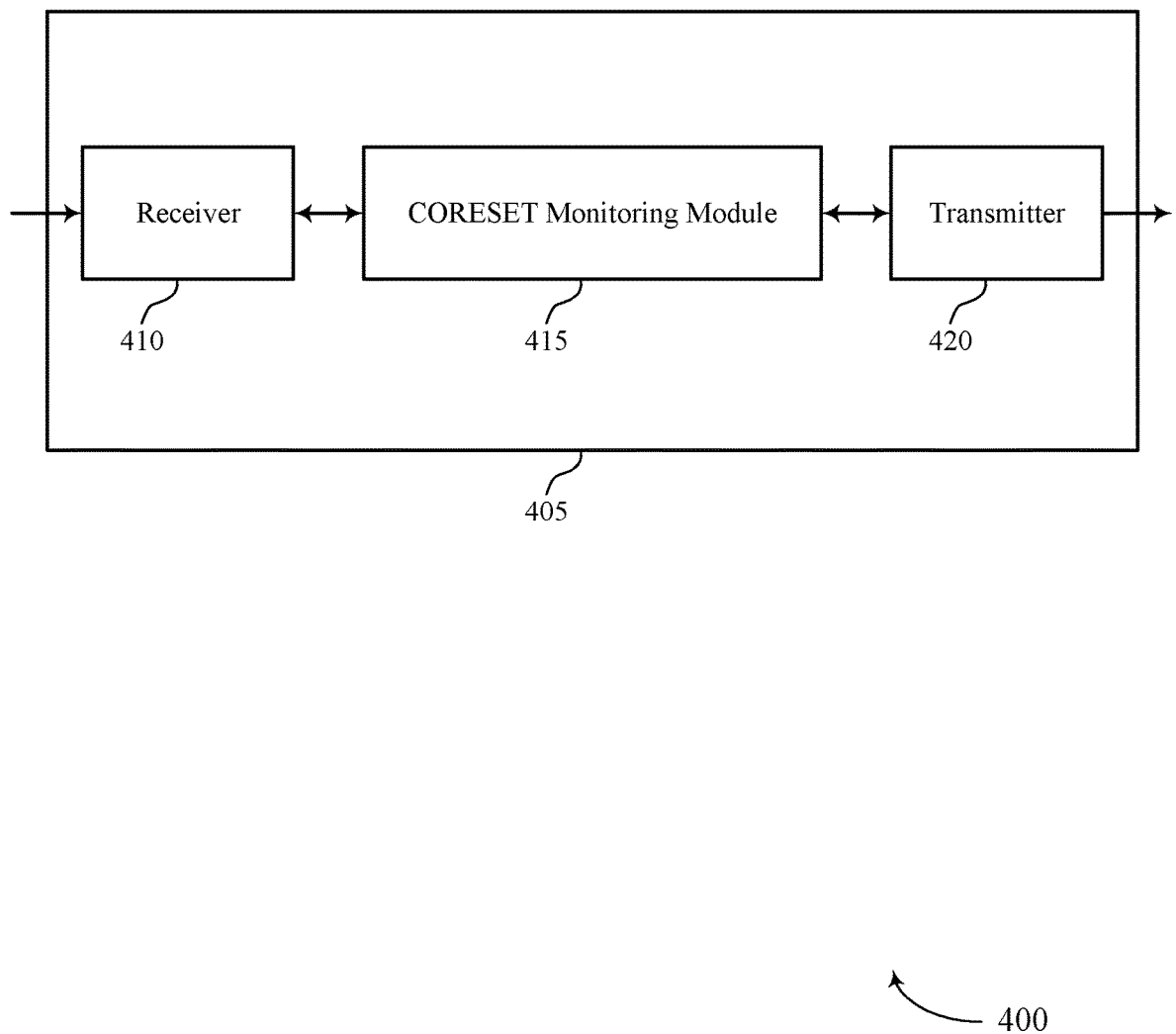
FIGS. 4 and 5 show block diagrams of devices that support CORESET monitoring rules based on active QCL assumption capabilities of a UE in accordance with aspects of the present disclosure.

FIG. 4 shows a block diagram 400 of a device 405 that supports CORESET monitoring rules based on active QCL assumption capabilities of a UE in accordance with aspects of the present disclosure. The device 405 may be an example of aspects of a UE 115 as described herein. The device 405 may include a receiver 410, a CORESET monitoring module 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to CORESET monitoring rules based on active QCL assumption capabilities of a UE, etc.). Information may be passed on to other components of the device 405. The receiver 410 may be an example of aspects of the transceiver 720 described with reference to FIG. 7. The receiver 410 may utilize a single antenna or a set of antennas.

The CORESET monitoring module 415 may identify a configuration for a set of CORESETs, where the configuration for the set of CORESETs includes an updated active QCL assumption for a CORESET of the set of CORESETs, determine a priority order for monitoring the set of CORESETs, where the CORESET associated with the updated active QCL assumption corresponds to a highest priority of the priority order, and monitor for downlink transmissions in at least a subset of the set of CORESETs based on the priority order and a number of active QCL assumptions for the set of CORESETs exceeding a threshold number of active QCL assumptions for the UE (e.g., device 405) based on the updated active QCL assumption. The CORESET monitoring module 415 may be an example of aspects of the CORESET monitoring module 710 described herein.

The actions performed by the CORESET monitoring module 415 as described herein may be implemented to realize one or more potential advantages. For example, the UE 115 may follow monitoring rules for CORESETs known to both the UE 115 and a base station 105. As such, the UE 115 may detect control information transmitted by the base station 105 according to these monitoring rules. In an example, identifying a configuration for CORESETs and determining a priority order for monitoring the CORESETs may support improved reliability in monitoring for and receiving control information at the UE 115. This may lower channel overhead between the UE 115 and a base station 105, as the improved reliability may result in fewer retransmissions of control information. Further, by using a priority order for monitoring the CORESETs, the UE 115 may successfully detect control information, which may lower communications latency.

The CORESET monitoring module 415, or its sub-components, may be implemented in hardware, code (e.g., software or firmware) executed by a processor, or any combination thereof. If implemented in code executed by a processor, the functions of the CORESET monitoring module 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The CORESET monitoring module 415, or its sub-components, may be physically located at various positions, including being distributed such that portions of functions are implemented at different physical locations by one or more physical components. In some examples, the CORESET monitoring module 415, or its sub-components, may be a separate and distinct component in accordance with various aspects of the present disclosure. In some examples, the CORESET monitoring module 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
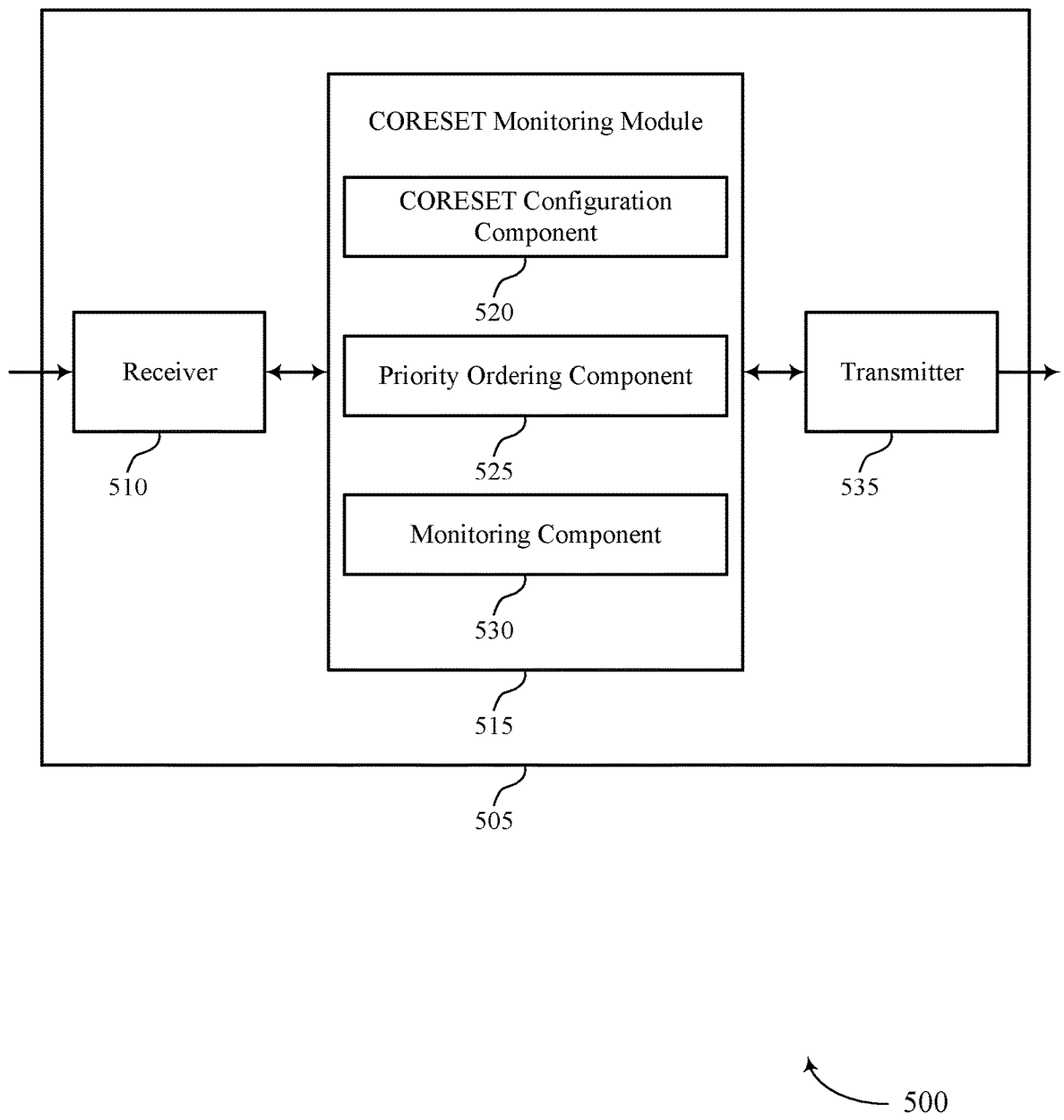

FIG. 5 shows a block diagram 500 of a device 505 that supports CORESET monitoring rules based on active QCL assumption capabilities of a UE in accordance with aspects of the present disclosure. The device 505 may be an example of aspects of a device 405 or a UE 115 as described herein. The device 505 may include a receiver 510, a CORESET monitoring module 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to CORESET monitoring rules based on active QCL assumption capabilities of a UE, etc.). Information may be passed on to other components of the device 505. The receiver 510 may be an example of aspects of the transceiver 720 described with reference to FIG. 7. The receiver 510 may utilize a single antenna or a set of antennas.

The CORESET monitoring module 515 may be an example of aspects of the CORESET monitoring module 415 as described herein. The CORESET monitoring module 515 may include a CORESET configuration component 520, a priority ordering component 525, and a monitoring component 530. The CORESET monitoring module 515 may be an example of aspects of the CORESET monitoring module 710 described herein.

The CORESET configuration component 520 may identify a configuration for a set of CORESETs, where the configuration for the set of CORESETs includes an updated active QCL assumption for a CORESET of the set of CORESETs.

The priority ordering component 525 may determine a priority order for monitoring the set of CORESETs, where the CORESET associated with the updated active QCL assumption corresponds to a highest priority of the priority order.

The monitoring component 530 may monitor for downlink transmissions in at least a subset of the set of CORESETs based on the priority order and a number of active QCL assumptions for the set of CORESETs exceeding a threshold number of active QCL assumptions for the UE (e.g., the device 505) based on the updated active QCL assumption.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
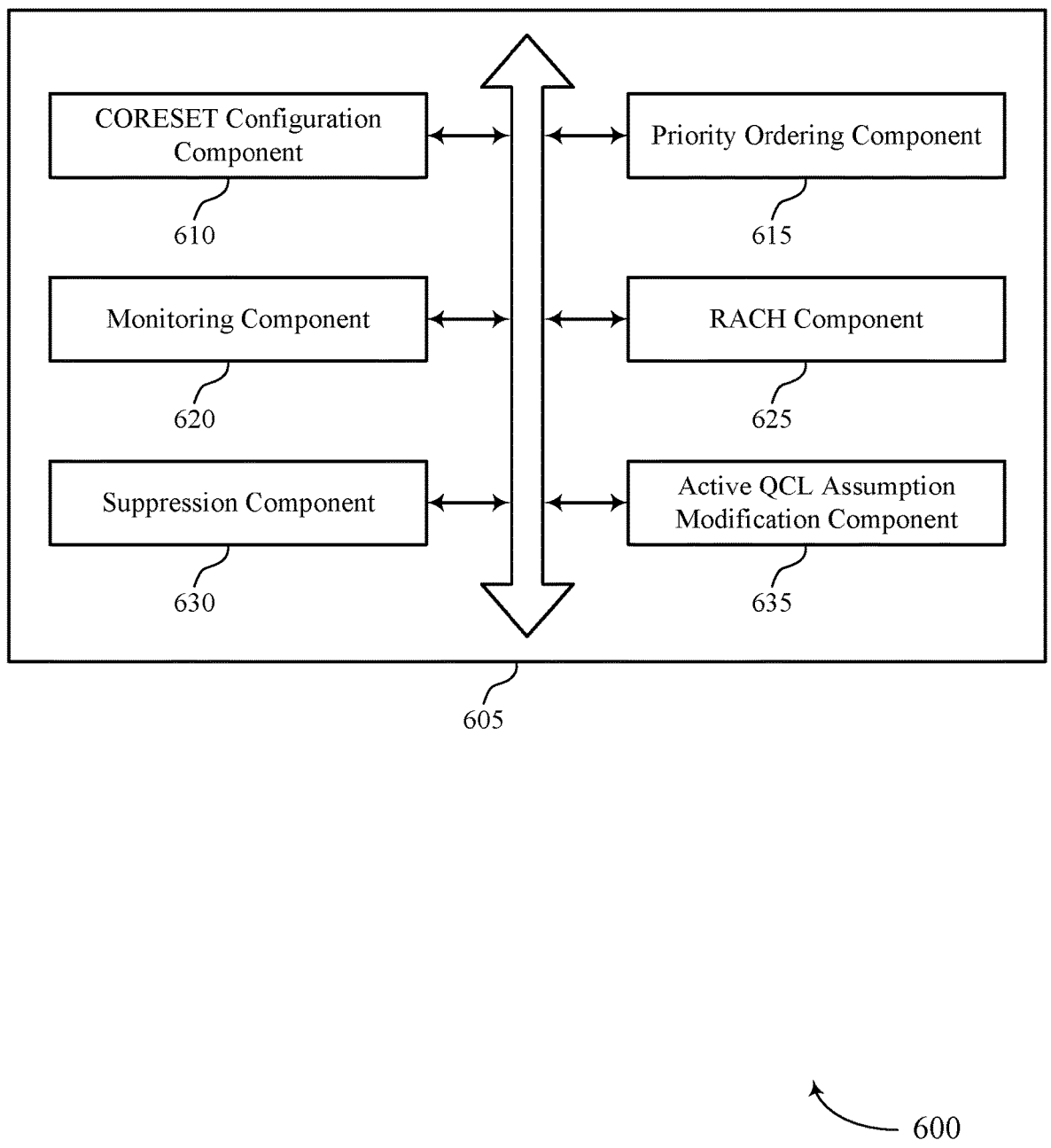
FIG. 6 shows a block diagram of a CORESET monitoring module that supports CORESET monitoring rules based on active QCL assumption capabilities of a UE in accordance with aspects of the present disclosure.

FIG. 6 shows a block diagram 600 of a CORESET monitoring module 605 that supports CORESET monitoring rules based on active QCL assumption capabilities of a UE in accordance with aspects of the present disclosure. The CORESET monitoring module 605 may be an example of aspects of a CORESET monitoring module 415, a CORESET monitoring module 515, or a CORESET monitoring module 710 described herein. The CORESET monitoring module 605 may include a CORESET configuration component 610, a priority ordering component 615, a monitoring component 620, a RACH component 625, a suppression component 630, and an active QCL assumption modification component 635. Each of these modules may communicate, directly or indirectly, with one another (e.g., via one or more buses).

The CORESET configuration component 610 may identify a configuration for a set of CORESETs, where the configuration for the set of CORESETs includes an updated active QCL assumption for a CORESET of the set of CORESETs.

The priority ordering component 615 may determine a priority order for monitoring the set of CORESETs, where the CORESET associated with the updated active QCL assumption corresponds to a highest priority of the priority order. In some cases, the set of CORESETs includes the CORESET associated with the updated active QCL assumption and a set of additional CORESETs.

In some examples, the priority ordering component 615 may determine the priority order for monitoring the set of additional CORESETs based on a CORESET ID value for each CORESET of the set of additional CORESETs. In some examples, the priority ordering component 615 may determine the priority order for monitoring the set of additional CORESETs based on a monitoring period length for each CORESET of the set of additional CORESETs. In some examples, the priority ordering component 615 may determine the priority order for monitoring the set of additional CORESETs based on a reference signal received power associated with each CORESET of the set of additional CORESETs.

In some examples, the priority ordering component 615 may determine the priority order for monitoring the set of additional CORESETs based on a type of search space associated with each CORESET of the set of additional CORESETs. In some cases, the type of search space includes either a CSS or a UESS. In some examples, the priority ordering component 615 may determine the priority order for monitoring the set of additional CORESETs based on one or more search space IDs associated with each CORESET of the set of additional CORESETs.

The monitoring component 620 may monitor for downlink transmissions in at least a subset of the set of CORESETs based on the priority order and a number of active QCL assumptions for the set of CORESETs exceeding a threshold number of active QCL assumptions for the UE based on the updated active QCL assumption. In some cases, the downlink transmissions may be examples of PDCCH transmissions.

In some examples, the monitoring component 620 may monitor for the downlink transmissions in a first subset of the set of CORESETs, where a number of active QCL assumptions for the first subset of the set of CORESETs is less than or equal to the threshold number of active QCL assumptions for the UE. In these examples, the suppression component 630 may suppress monitoring for a second subset of the set of CORESETs, where the second subset of the set of CORESETs corresponds to as set of lower priorities of the priority order than the first subset of the set of CORESETs.

In other examples, the monitoring component 620 may monitor for the downlink transmissions in a first subset of the set of CORESETs, where a number of active QCL assumptions for the first subset of the set of CORESETs is less than or equal to the threshold number of active QCL assumptions for the UE. In these examples, the active QCL assumption modification component 635 may modify active QCL assumptions for a second subset of the set of CORESETs, where the second subset of the set of CORESETs corresponds to a set of lower priorities of the priority order than the first subset of the set of CORESETs, and where the modified active QCL assumptions include active QCL assumptions for the first subset of the set of CORESETs. In these examples, the monitoring component 620 may additionally monitor for the downlink transmissions in the second subset of the set of CORESETs according to the modified active QCL assumptions.

The RACH component 625 may transmit, to a base station, a RACH preamble message indicating a downlink beam for the CORESET of the set of CORESETs, where the updated active QCL assumption for the CORESET is based on the indicated downlink beam.

Figure 7:
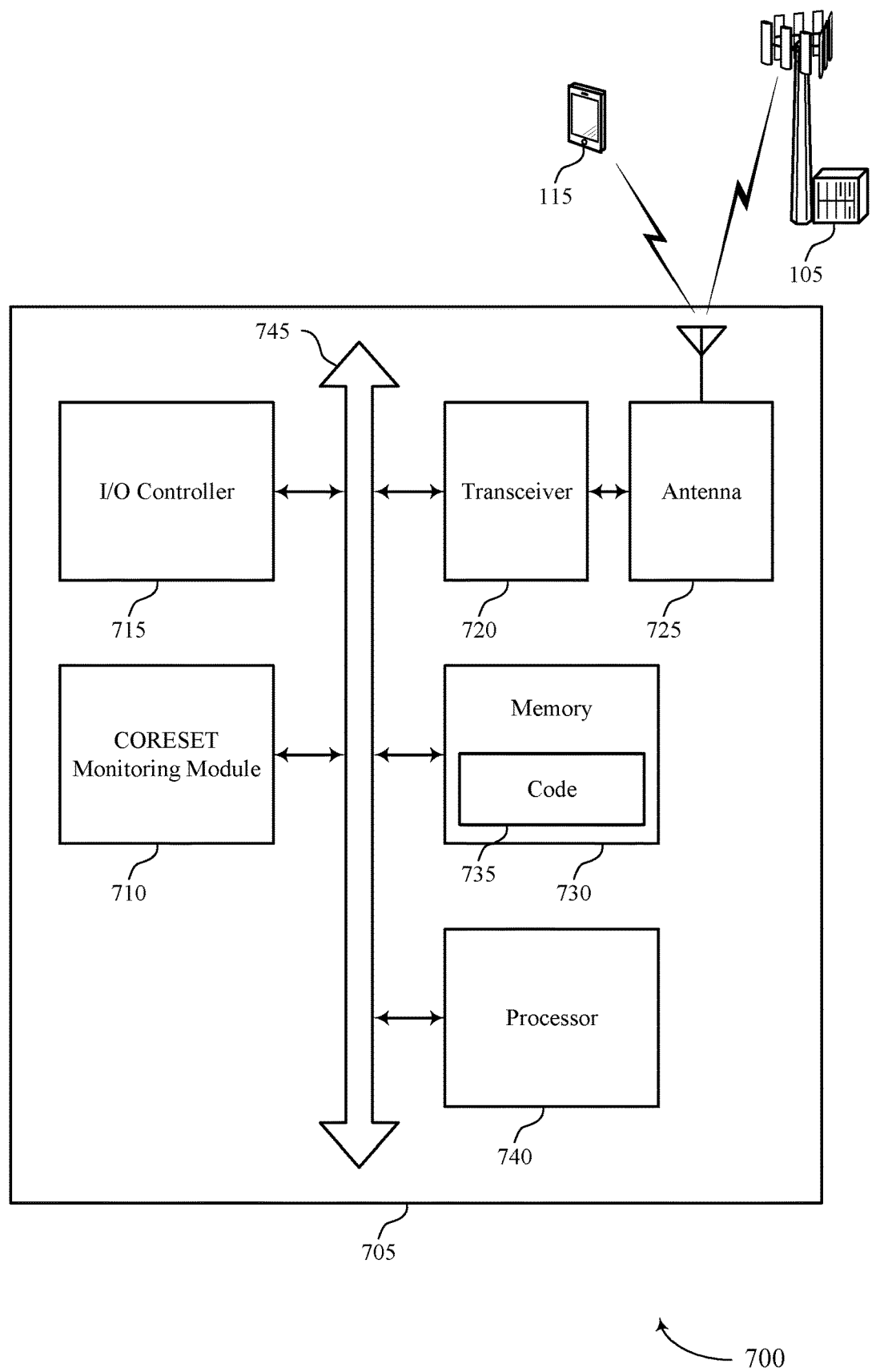
FIG. 7 shows a diagram of a system including a device that supports CORESET monitoring rules based on active QCL assumption capabilities of a UE in accordance with aspects of the present disclosure.

FIG. 7 shows a diagram of a system 700 including a device 705 that supports CORESET monitoring rules based on active QCL assumption capabilities of a UE in accordance with aspects of the present disclosure. The device 705 may be an example of or include the components of device 405, device 505, or a UE 115 as described herein. The device 705 may include components for bi-directional voice and data communications including components for transmitting and receiving communications, including a CORESET monitoring module 710, an I/O controller 715, a transceiver 720, an antenna 725, memory 730, and a processor 740. These components may be in electronic communication via one or more buses (e.g., bus 745).

The CORESET monitoring module 710 may identify a configuration for a set of CORESETs, where the configuration for the set of CORESETs includes an updated active QCL assumption for a CORESET of the set of CORESETs, determine a priority order for monitoring the set of CORESETs, where the CORESET associated with the updated active QCL assumption corresponds to a highest priority of the priority order, and monitor for downlink transmissions in at least a subset of the set of CORESETs based on the priority order and a number of active QCL assumptions for the set of CORESETs exceeding a threshold number of active QCL assumptions for the UE based on the updated active QCL assumption.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting CORESET monitoring rules based on active QCL assumption capabilities of a UE).

Based on monitoring for downlink transmissions in at least a subset of the set of CORESETs based on a priority order, the processor 740 of the UE 115 (e.g., a processor controlling the receiver 410, the CORESET monitoring module 415, the transmitter 420, etc.) may reduce processing resources used for monitoring CORESETs for control information. For example, identifying a configuration for CORESETs and determining a priority order for monitoring the CORESETs may support improved reliability in monitoring for and receiving control information at a UE 115. As such, the UE 115 may reduce the number of monitoring processes performed to successfully monitor CORESETS for control information. Reducing the number of monitoring processes may reduce a number of times the processor ramps up processing power and turns on processing units to handle CORESET monitoring.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
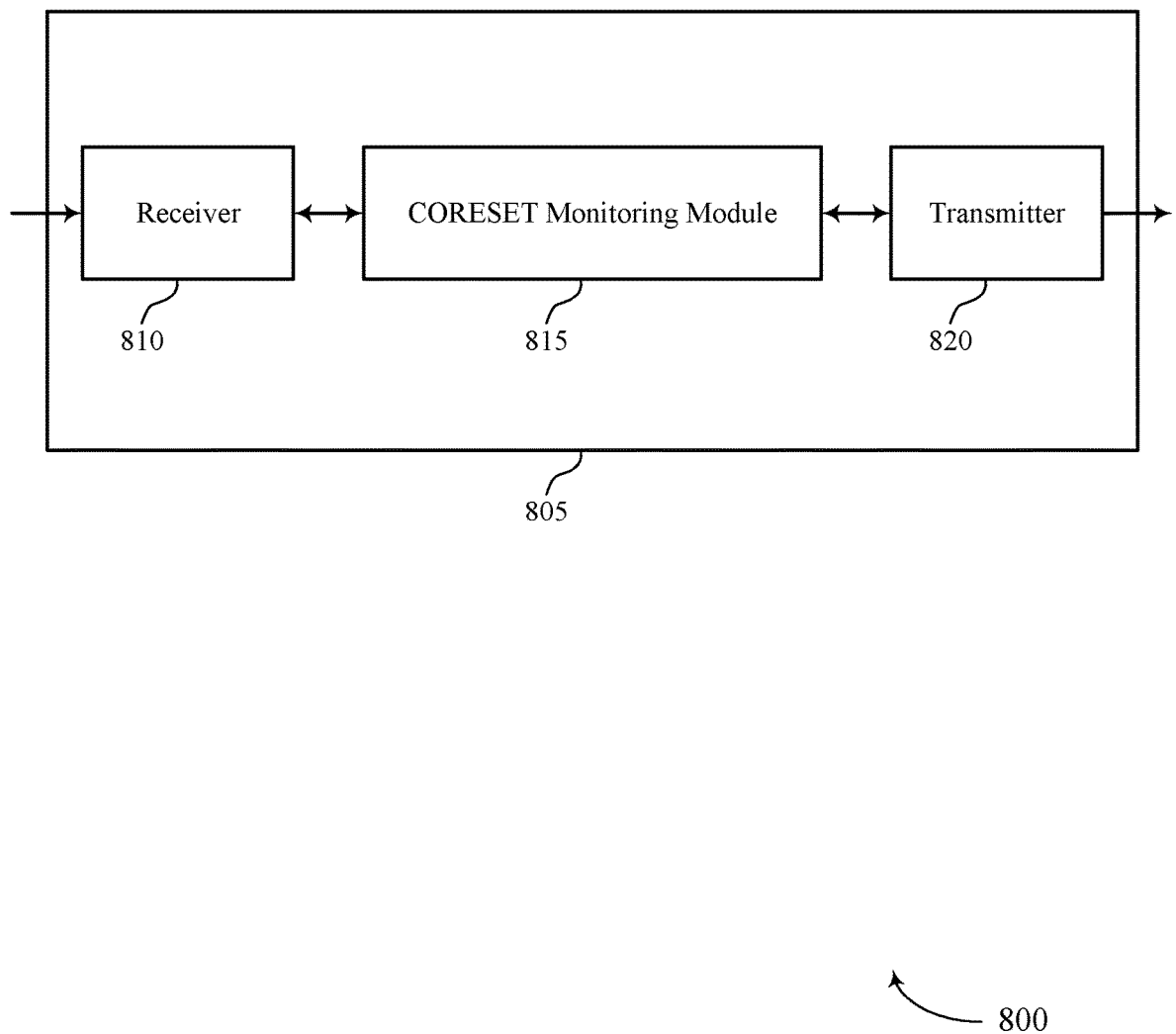
FIGS. 8 and 9 show block diagrams of devices that support CORESET monitoring rules based on active QCL assumption capabilities of a UE in accordance with aspects of the present disclosure.

FIG. 8 shows a block diagram 800 of a device 805 that supports CORESET monitoring rules based on active QCL assumption capabilities of a UE in accordance with aspects of the present disclosure. The device 805 may be an example of aspects of a base station 105 as described herein. The device 805 may include a receiver 810, a CORESET monitoring module 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to CORESET monitoring rules based on active QCL assumption capabilities of a UE, etc.). Information may be passed on to other components of the device 805. The receiver 810 may be an example of aspects of the transceiver 1120 described with reference to FIG. 11. The receiver 810 may utilize a single antenna or a set of antennas.

The CORESET monitoring module 815 may transmit, to a UE, a configuration for a set of CORESETs, where the configuration for the set of CORESETs includes an updated active QCL assumption for a CORESET of the set of CORESETs, determine a priority order for the UE monitoring the set of CORESETs, where the CORESET associated with the updated active QCL assumption corresponds to a highest priority of the priority order, and transmit a downlink transmission in a search space of a CORESET for transmission according to an active QCL assumption for the CORESET for transmission, where the CORESET for transmission, the active QCL assumption for the CORESET for transmission, or both are based on the priority order and a number of active QCL assumptions for the set of CORESETs exceeding a threshold number of active QCL assumptions for the UE based on the updated active QCL assumption. The CORESET monitoring module 815 may be an example of aspects of the CORESET monitoring module 1110 described herein.

The CORESET monitoring module 815, or its sub-components, may be implemented in hardware, code (e.g., software or firmware) executed by a processor, or any combination thereof. If implemented in code executed by a processor, the functions of the CORESET monitoring module 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The CORESET monitoring module 815, or its sub-components, may be physically located at various positions, including being distributed such that portions of functions are implemented at different physical locations by one or more physical components. In some examples, the CORESET monitoring module 815, or its sub-components, may be a separate and distinct component in accordance with various aspects of the present disclosure. In some examples, the CORESET monitoring module 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
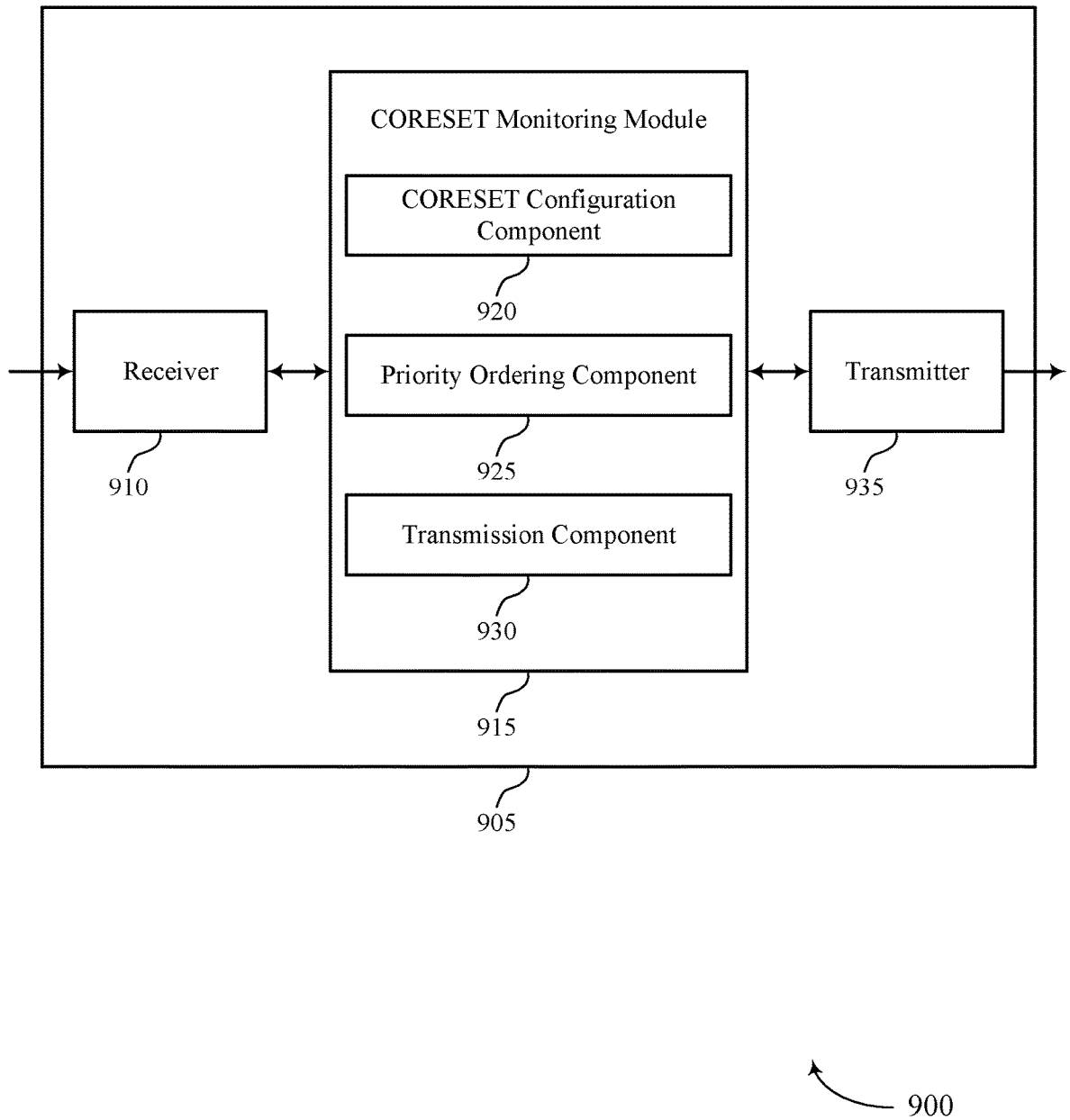

FIG. 9 shows a block diagram 900 of a device 905 that supports CORESET monitoring rules based on active QCL assumption capabilities of a UE in accordance with aspects of the present disclosure. The device 905 may be an example of aspects of a device 805, or a base station 105 as described herein. The device 905 may include a receiver 910, a CORESET monitoring module 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to CORESET monitoring rules based on active QCL assumption capabilities of a UE, etc.). Information may be passed on to other components of the device 905. The receiver 910 may be an example of aspects of the transceiver 1120 described with reference to FIG. 11. The receiver 910 may utilize a single antenna or a set of antennas.

The CORESET monitoring module 915 may be an example of aspects of the CORESET monitoring module 815 as described herein. The CORESET monitoring module 915 may include a CORESET configuration component 920, a priority ordering component 925, and a transmission component 930. The CORESET monitoring module 915 may be an example of aspects of the CORESET monitoring module 1110 described herein.

The CORESET configuration component 920 may transmit, to a UE, a configuration for a set of CORESETs, where the configuration for the set of CORESETs includes an updated active QCL assumption for a CORESET of the set of CORESETs.

The priority ordering component 925 may determine a priority order for the UE monitoring the set of CORESETs, where the CORESET associated with the updated active QCL assumption corresponds to a highest priority of the priority order.

The transmission component 930 may transmit a downlink transmission in a search space of a CORESET for transmission according to an active QCL assumption for the CORESET for transmission, where the CORESET for transmission, the active QCL assumption for the CORESET for transmission, or both are based on the priority order and a number of active QCL assumptions for the set of CORESETs exceeding a threshold number of active QCL assumptions for the UE based on the updated active QCL assumption.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
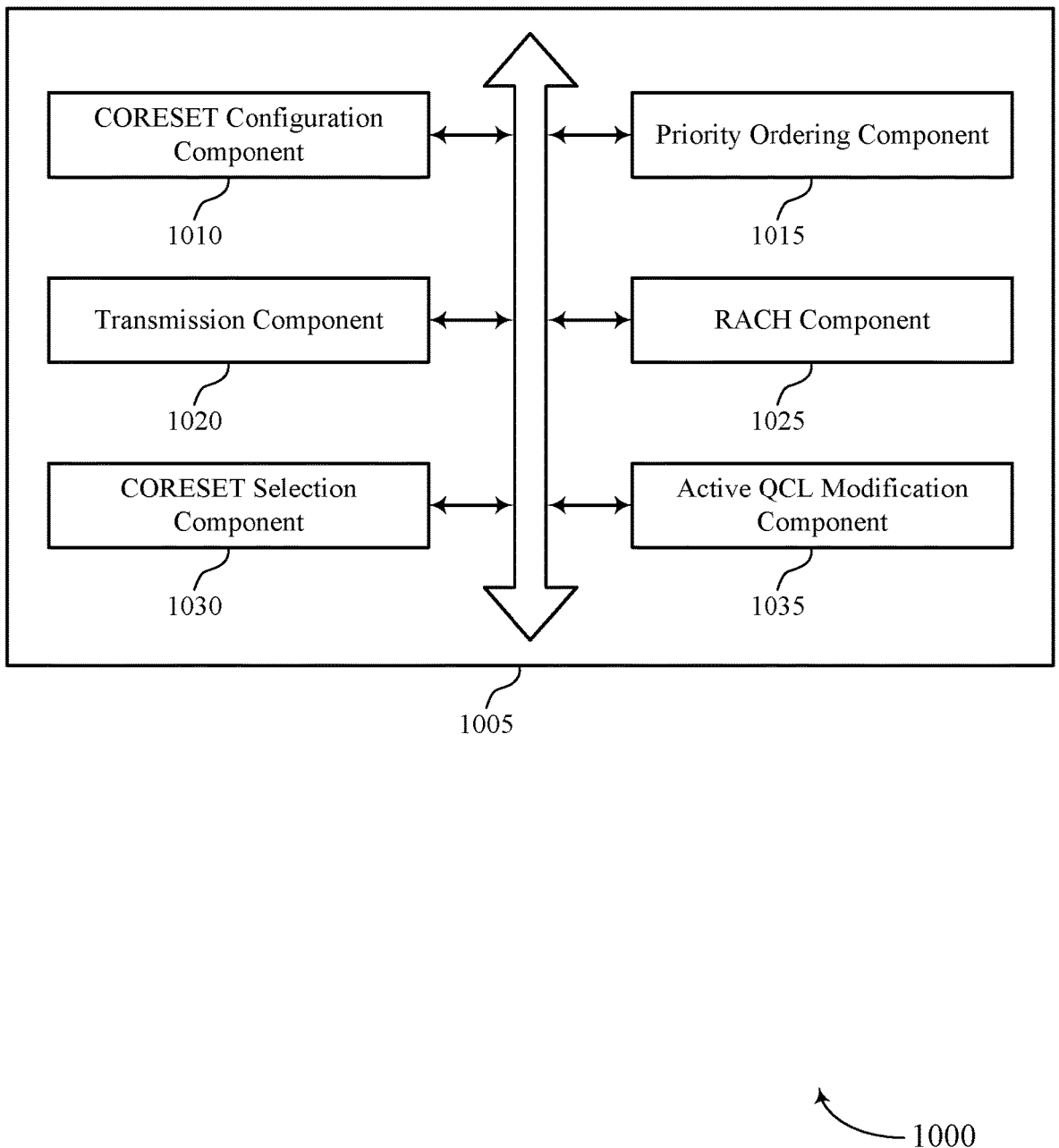
FIG. 10 shows a block diagram of a CORESET monitoring module that supports CORESET monitoring rules based on active QCL assumption capabilities of a UE in accordance with aspects of the present disclosure.

FIG. 10 shows a block diagram 1000 of a CORESET monitoring module 1005 that supports CORESET monitoring rules based on active QCL assumption capabilities of a UE in accordance with aspects of the present disclosure. The CORESET monitoring module 1005 may be an example of aspects of a CORESET monitoring module 815, a CORESET monitoring module 915, or a CORESET monitoring module 1110 described herein. The CORESET monitoring module 1005 may include a CORESET configuration component 1010, a priority ordering component 1015, a transmission component 1020, a RACH component 1025, a CORESET selection component 1030, and an active QCL modification component 1035. Each of these modules may communicate, directly or indirectly, with one another (e.g., via one or more buses).

The CORESET configuration component 1010 may transmit, to a UE, a configuration for a set of CORESETs, where the configuration for the set of CORESETs includes an updated active QCL assumption for a CORESET of the set of CORESETs.

The priority ordering component 1015 may determine a priority order for the UE monitoring the set of CORESETs, where the CORESET associated with the updated active QCL assumption corresponds to a highest priority of the priority order. In some cases, the set of CORESETs includes the CORESET associated with the updated active QCL assumption and a set of additional CORESETs. In some examples, the priority ordering component 1015 may determine the priority order for the UE monitoring the set of additional CORESETs based on a CORESET ID value for each CORESET of the set of additional CORESETs, a monitoring period length for each CORESET of the set of additional CORESETs, a reference signal received power associated with each CORESET of the set of additional CORESETs, a type of search space associated with each CORESET of the set of additional CORESETs, one or more search space IDs associated with each CORESET of the set of additional CORESETs, or a combination thereof.

The transmission component 1020 may transmit a downlink transmission in a search space of a CORESET for transmission according to an active QCL assumption for the CORESET for transmission, where the CORESET for transmission, the active QCL assumption for the CORESET for transmission, or both are based on the priority order and a number of active QCL assumptions for the set of CORESETs exceeding a threshold number of active QCL assumptions for the UE based on the updated active QCL assumption. In some cases, the downlink transmission is an example of a PDCCH transmission.

The RACH component 1025 may receive, from the UE, a RACH preamble message indicating a downlink beam for the CORESET associated with the updated active QCL assumption, where the updated active QCL assumption for the CORESET is based on the indicated downlink beam.

In some cases, the CORESET selection component 1030 may select the CORESET for transmission from a first subset of the set of CORESETs, where a number of active QCL assumptions for the first subset of the set of CORESETs is less than or equal to the threshold number of active QCL assumptions for the UE, and where the first subset of the set of CORESETs corresponds to a set of higher priorities of the priority order than a second subset of the set of CORESETs.

In other cases, the CORESET selection component 1030 may select the CORESET for transmission from either a first subset of the set of CORESETs or a second subset of the set of CORESETs, where a number of active QCL assumptions for the first subset of the set of CORESETs is less than or equal to the threshold number of active QCL assumptions for the UE, and where the first subset of the set of CORESETs corresponds to a set of higher priorities of the priority order than the second subset of the set of CORESETs. In these cases, if the CORESET for transmission is selected from the second subset of the set of CORESETs, the active QCL modification component 1035 may modify the active QCL assumption for the CORESET for transmission, where the modified active QCL assumption for the CORESET for transmission includes an active QCL assumption for at least one CORESET of the first subset of the set of CORESETs.

Figure 11:
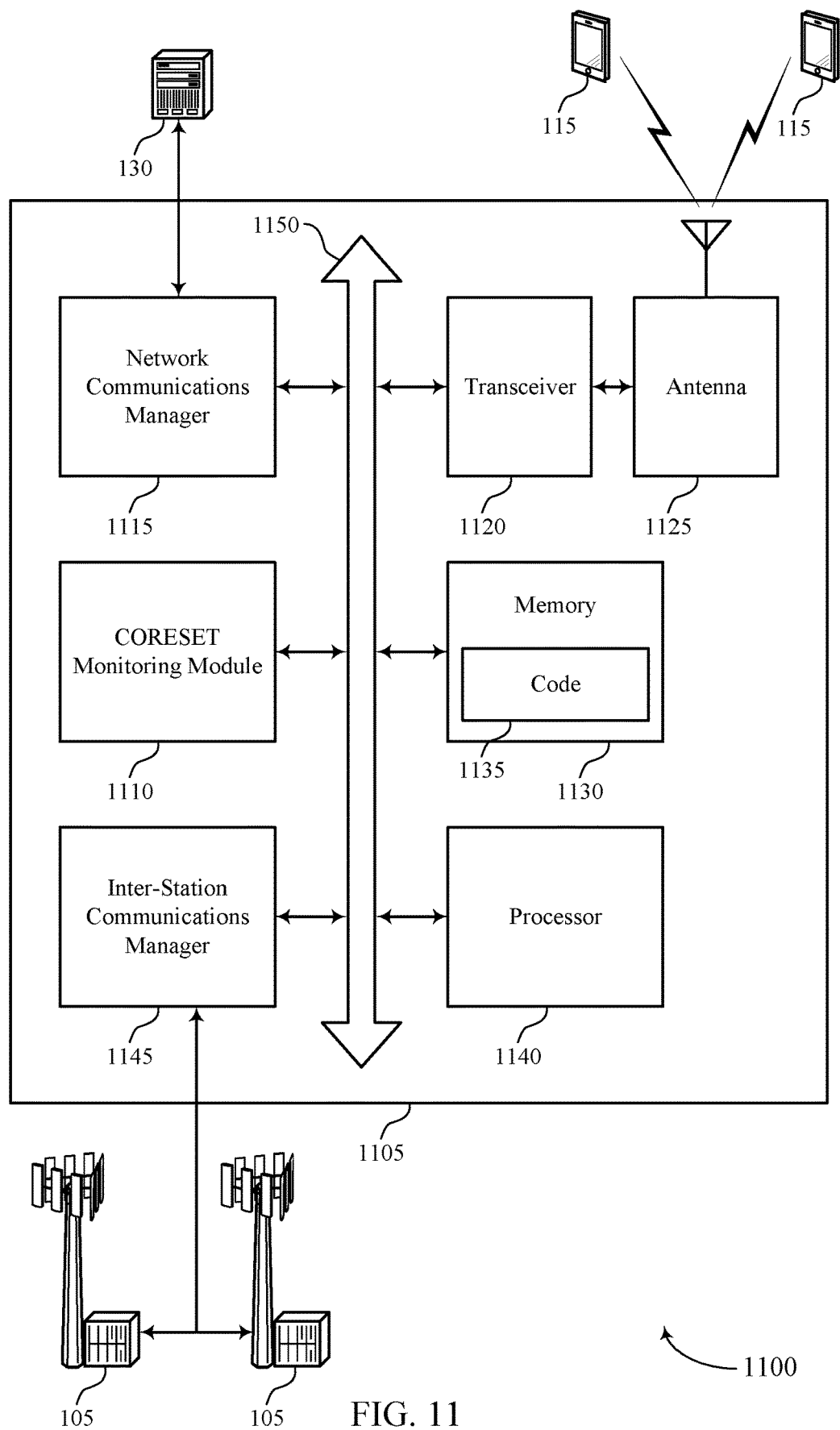
FIG. 11 shows a diagram of a system including a device that supports CORESET monitoring rules based on active QCL assumption capabilities of a UE in accordance with aspects of the present disclosure.

FIG. 11 shows a diagram of a system 1100 including a device 1105 that supports CORESET monitoring rules based on active QCL assumption capabilities of a UE in accordance with aspects of the present disclosure. The device 1105 may be an example of or include the components of device 805, device 905, or a base station 105 as described herein. The device 1105 may include components for bi-directional voice and data communications including components for transmitting and receiving communications, including a CORESET monitoring module 1110, a network communications manager 1115, a transceiver 1120, an antenna 1125, memory 1130, a processor 1140, and an inter-station communications manager 1145. These components may be in electronic communication via one or more buses (e.g., bus 1150).

The CORESET monitoring module 1110 may transmit, to a UE, a configuration for a set of CORESETs, where the configuration for the set of CORESETs includes an updated active QCL assumption for a CORESET of the set of CORESETs, determine a priority order for the UE monitoring the set of CORESETs, where the CORESET associated with the updated active QCL assumption corresponds to a highest priority of the priority order, and transmit a downlink transmission in a search space of a CORESET for transmission according to an active QCL assumption for the CORESET for transmission, where the CORESET for transmission, the active QCL assumption for the CORESET for transmission, or both are based on the priority order and a number of active QCL assumptions for the set of CORESETs exceeding a threshold number of active QCL assumptions for the UE based on the updated active QCL assumption.

The network communications manager 1115 may manage communications with the core network 130 (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting CORESET monitoring rules based on active QCL assumption capabilities of a UE).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
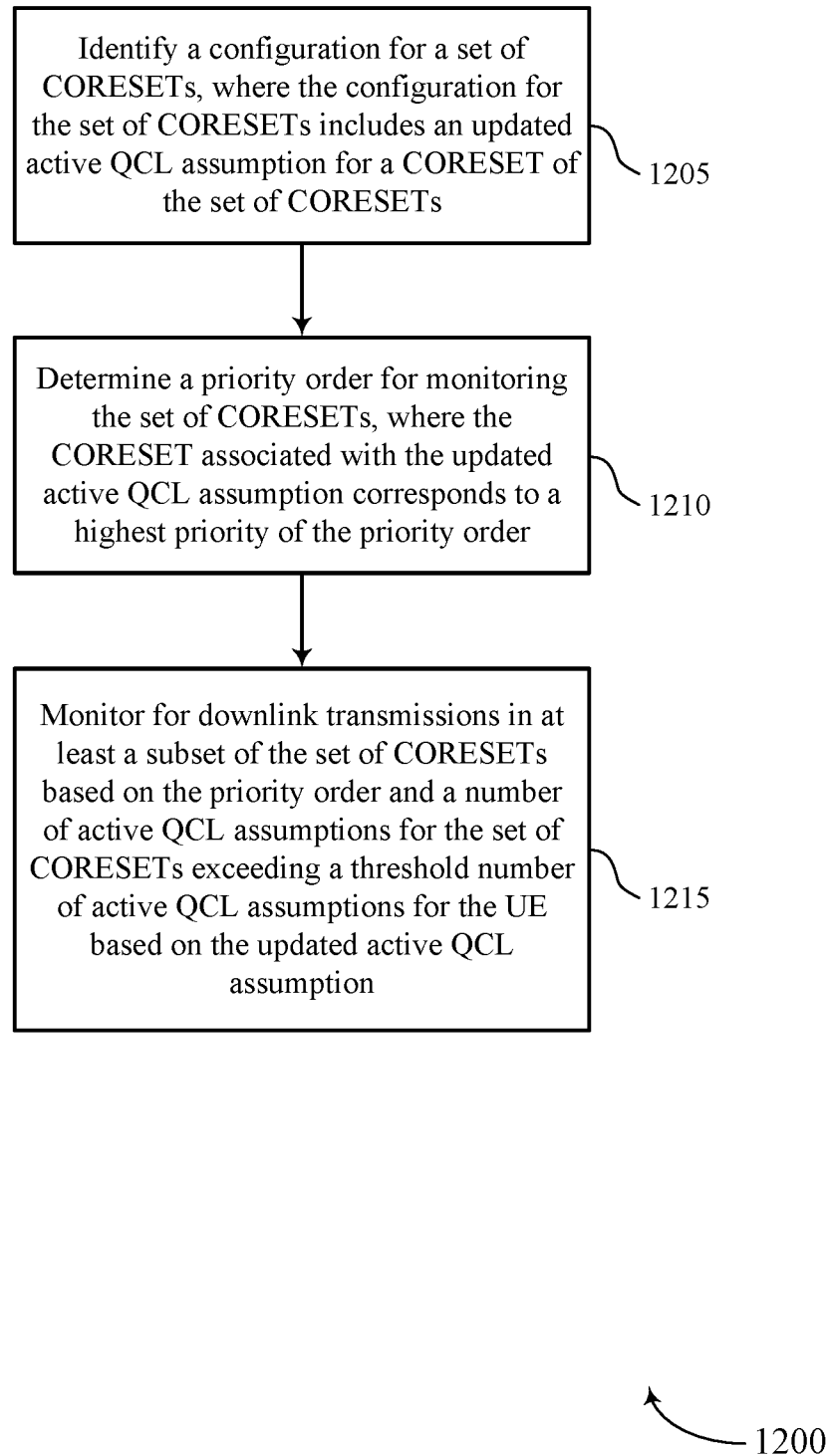
FIGS. 12 through 15 show flowcharts illustrating methods that support CORESET monitoring rules based on active QCL assumption capabilities of a UE in accordance with aspects of the present disclosure.

FIG. 12 shows a flowchart illustrating a method 1200 that supports CORESET monitoring rules based on active QCL assumption capabilities of a UE in accordance with aspects of the present disclosure. The operations of method 1200 may be implemented by a UE 115 or its components as described herein. For example, the operations of method 1200 may be performed by a CORESET monitoring module as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may identify a configuration for a set of CORESETs, where the configuration for the set of CORESETs includes an updated active QCL assumption for a CORESET of the set of CORESETs. The operations of 1205 may be performed according to the methods described herein. In some examples, aspects of the operations of 1205 may be performed by a CORESET configuration component as described with reference to FIGS. 4 through 7.

At 1210, the UE may determine a priority order for monitoring the set of CORESETs, where the CORESET associated with the updated active QCL assumption corresponds to a highest priority of the priority order. The operations of 1210 may be performed according to the methods described herein. In some examples, aspects of the operations of 1210 may be performed by a priority ordering component as described with reference to FIGS. 4 through 7.

At 1215, the UE may monitor for downlink transmissions (e.g., downlink control channel transmissions) in at least a subset of the set of CORESETs based on the priority order and a number of active QCL assumptions for the set of CORESETs exceeding a threshold number of active QCL assumptions for the UE based on the updated active QCL assumption. The operations of 1215 may be performed according to the methods described herein. In some examples, aspects of the operations of 1215 may be performed by a monitoring component as described with reference to FIGS. 4 through 7.

Figure 13:
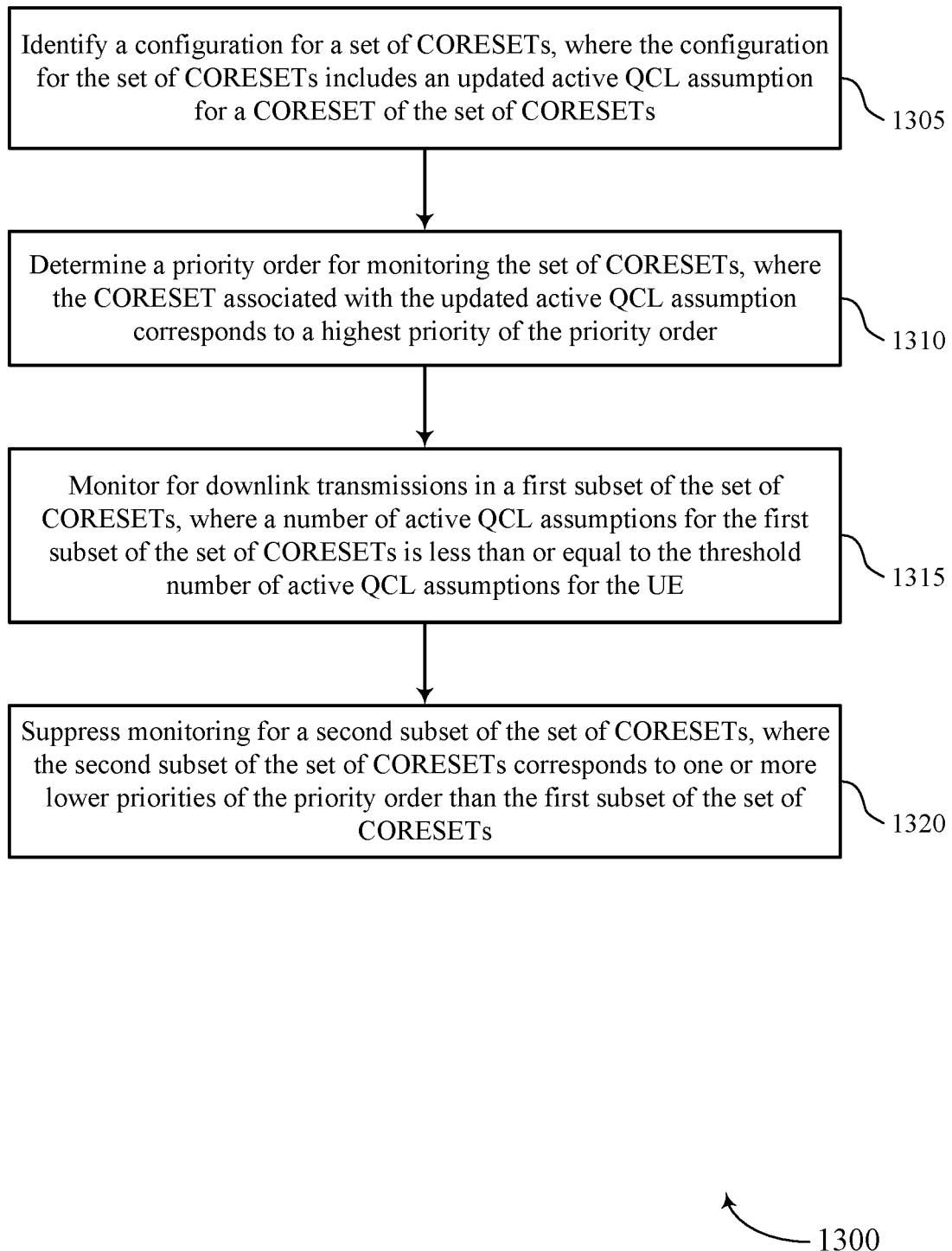

FIG. 13 shows a flowchart illustrating a method 1300 that supports CORESET monitoring rules based on active QCL assumption capabilities of a UE in accordance with aspects of the present disclosure. The operations of method 1300 may be implemented by a UE 115 or its components as described herein. For example, the operations of method 1300 may be performed by a CORESET monitoring module as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may identify a configuration for a set of CORESETs, where the configuration for the set of CORESETs includes an updated active QCL assumption for a CORESET of the set of CORESETs. For example, the UE may receive the configuration from a base station or may determine the configuration. The operations of 1305 may be performed according to the methods described herein. In some examples, aspects of the operations of 1305 may be performed by a CORESET configuration component as described with reference to FIGS. 4 through 7.

At 1310, the UE may determine a priority order for monitoring the set of CORESETs, where the CORESET associated with the updated active QCL assumption corresponds to a highest priority of the priority order. The operations of 1310 may be performed according to the methods described herein. In some examples, aspects of the operations of 1310 may be performed by a priority ordering component as described with reference to FIGS. 4 through 7.

At 1315, the UE may monitor for downlink transmissions in at least a subset of the set of CORESETs based on the priority order and a number of active QCL assumptions for the set of CORESETs exceeding a threshold number of active QCL assumptions for the UE based on the updated active QCL assumption. For example, the UE may monitor for the downlink transmissions in a first subset of the set of CORESETs, where a number of active QCL assumptions for the first subset of the set of CORESETs is less than or equal to the threshold number of active QCL assumptions for the UE. The operations of 1315 may be performed according to the methods described herein. In some examples, aspects of the operations of 1315 may be performed by a monitoring component as described with reference to FIGS. 4 through 7.

At 1320, the UE may suppress monitoring for a second subset of the set of CORESETs, where the second subset of the set of CORESETs corresponds to a set of lower priorities of the priority order than the first subset of the set of CORESETs. The operations of 1320 may be performed according to the methods described herein. In some examples, aspects of the operations of 1320 may be performed by a suppression component as described with reference to FIGS. 4 through 7.

Figure 14:
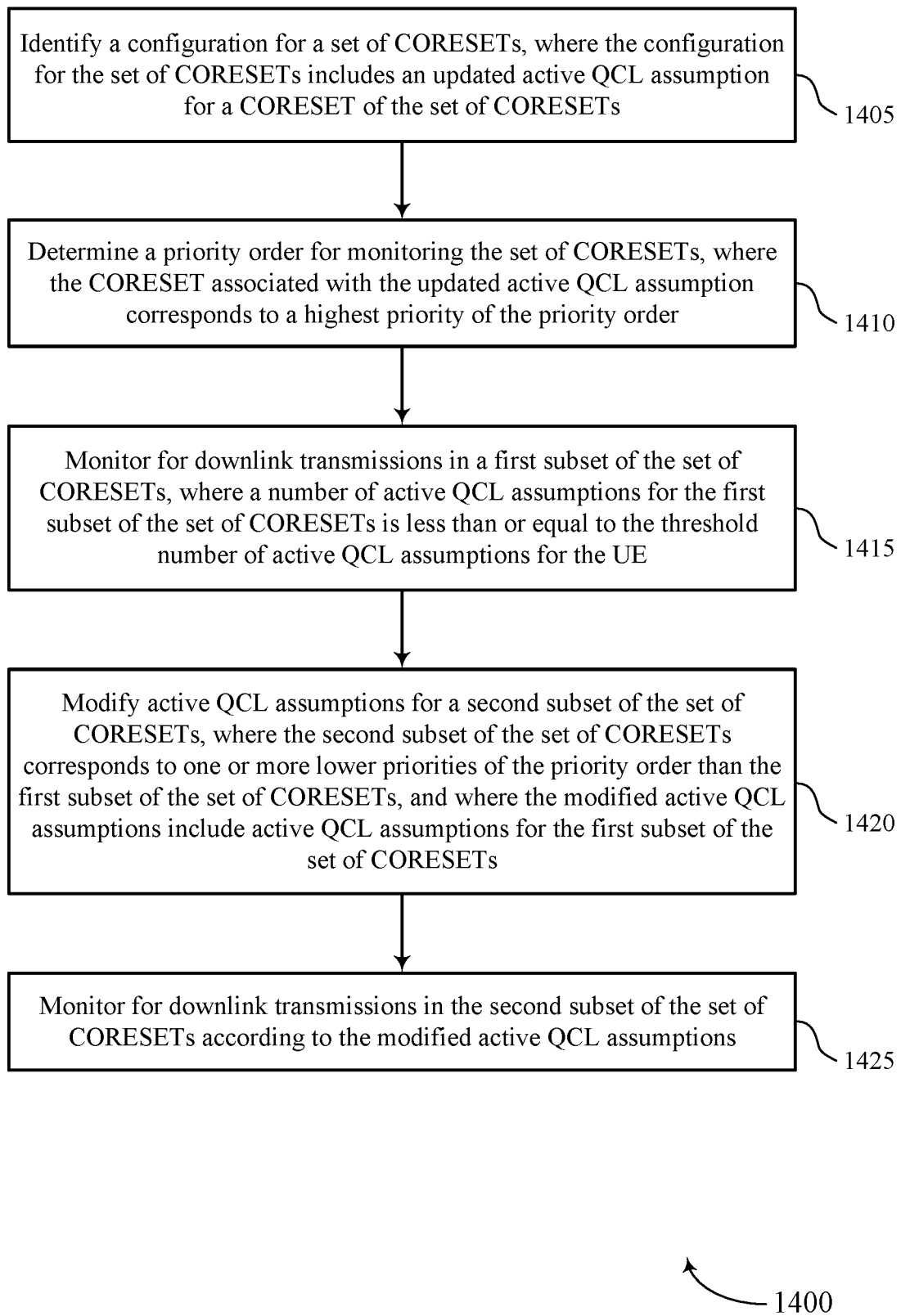

FIG. 14 shows a flowchart illustrating a method 1400 that supports CORESET monitoring rules based on active QCL assumption capabilities of a UE in accordance with aspects of the present disclosure. The operations of method 1400 may be implemented by a UE 115 or its components as described herein. For example, the operations of method 1400 may be performed by a CORESET monitoring module as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may identify a configuration for a set of CORESETs, where the configuration for the set of CORESETs includes an updated active QCL assumption for a CORESET of the set of CORESETs. The operations of 1405 may be performed according to the methods described herein. In some examples, aspects of the operations of 1405 may be performed by a CORESET configuration component as described with reference to FIGS. 4 through 7.

At 1410, the UE may determine a priority order for monitoring the set of CORESETs, where the CORESET associated with the updated active QCL assumption corresponds to a highest priority of the priority order. The operations of 1410 may be performed according to the methods described herein. In some examples, aspects of the operations of 1410 may be performed by a priority ordering component as described with reference to FIGS. 4 through 7.

At 1415, the UE may monitor for downlink transmissions in at least a subset of the set of CORESETs based on the priority order and a number of active QCL assumptions for the set of CORESETs exceeding a threshold number of active QCL assumptions for the UE based on the updated active QCL assumption. For example, the UE may monitor for the downlink transmissions in a first subset of the set of CORESETs, where a number of active QCL assumptions for the first subset of the set of CORESETs is less than or equal to the threshold number of active QCL assumptions for the UE. The operations of 1415 may be performed according to the methods described herein. In some examples, aspects of the operations of 1415 may be performed by a monitoring component as described with reference to FIGS. 4 through 7.

At 1420, the UE may modify active QCL assumptions for a second subset of the set of CORESETs, where the second subset of the set of CORESETs corresponds to a set of lower priorities of the priority order than the first subset of the set of CORESETs, and where the modified active QCL assumptions include active QCL assumptions for the first subset of the set of CORESETs. The operations of 1420 may be performed according to the methods described herein. In some examples, aspects of the operations of 1420 may be performed by an active QCL assumption modification component as described with reference to FIGS. 4 through 7.

At 1425, the UE may monitor for the downlink transmissions in the second subset of the set of CORESETs according to the modified active QCL assumptions. The operations of 1425 may be performed according to the methods described herein. In some examples, aspects of the operations of 1425 may be performed by a monitoring component as described with reference to FIGS. 4 through 7.

Figure 15:
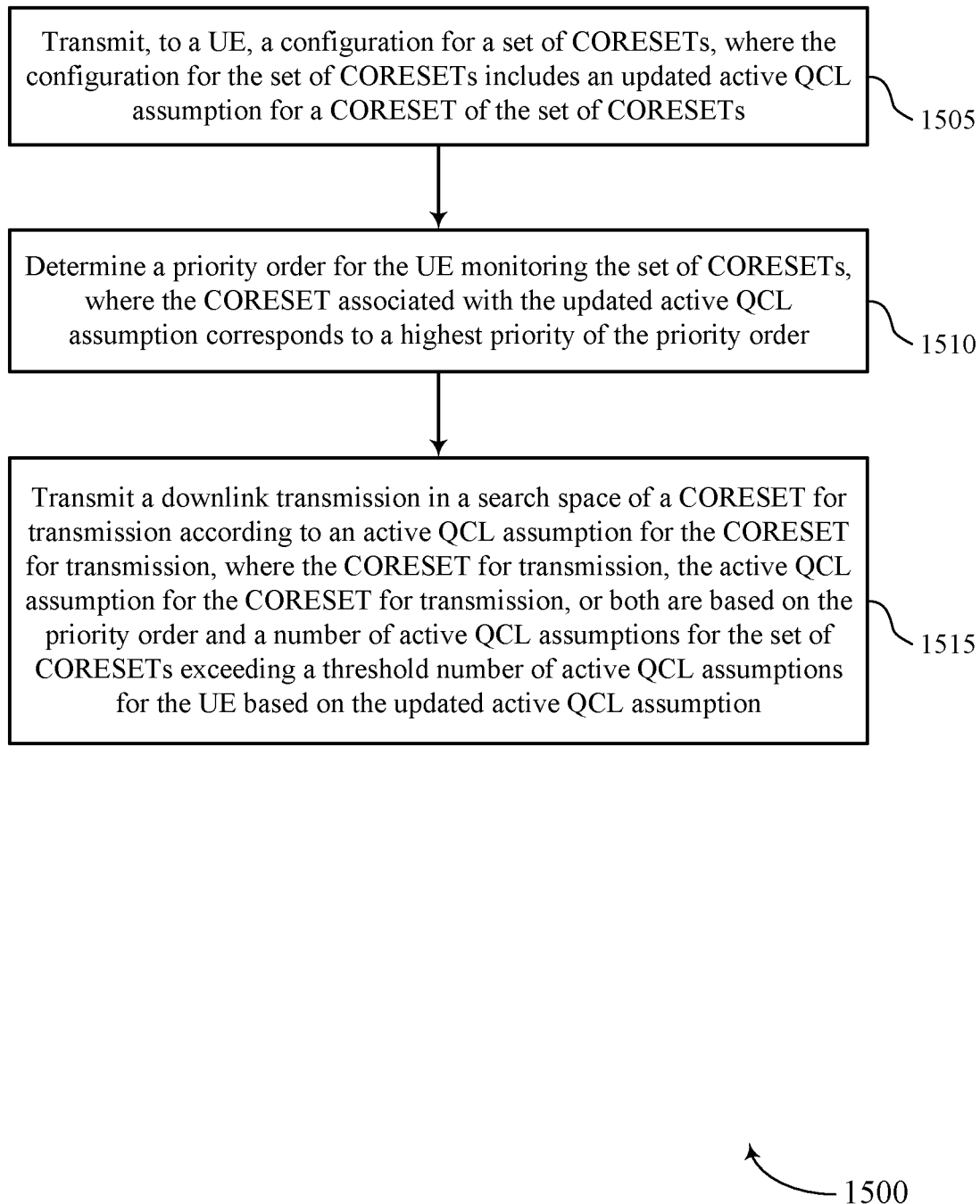

FIG. 15 shows a flowchart illustrating a method 1500 that supports CORESET monitoring rules based on active QCL assumption capabilities of a UE in accordance with aspects of the present disclosure. The operations of method 1500 may be implemented by a base station 105 or its components as described herein. For example, the operations of method 1500 may be performed by a CORESET monitoring module as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit, to a UE, a configuration for a set of CORESETs, where the configuration for the set of CORESETs includes an updated active QCL assumption for a CORESET of the set of CORESETs. The operations of 1505 may be performed according to the methods described herein. In some examples, aspects of the operations of 1505 may be performed by a CORESET configuration component as described with reference to FIGS. 8 through 11.

At 1510, the base station may determine a priority order for the UE monitoring the set of CORESETs, where the CORESET associated with the updated active QCL assumption corresponds to a highest priority of the priority order. The operations of 1510 may be performed according to the methods described herein. In some examples, aspects of the operations of 1510 may be performed by a priority ordering component as described with reference to FIGS. 8 through 11.

At 1515, the base station may transmit a downlink transmission (e.g., a control channel transmission) in a search space of a CORESET for transmission according to an active QCL assumption for the CORESET for transmission, where the CORESET for transmission, the active QCL assumption for the CORESET for transmission, or both are based on the priority order and a number of active QCL assumptions for the set of CORESETs exceeding a threshold number of active QCL assumptions for the UE based on the updated active QCL assumption. The operations of 1515 may be performed according to the methods described herein. In some examples, aspects of the operations of 1515 may be performed by a transmission component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a configuration for a plurality of control resource sets, wherein the configuration for the plurality of control resource sets comprises an updated active quasi-co-location assumption for a control resource set of the plurality of control resource sets;
    determining a priority order for monitoring the plurality of control resource sets, wherein the control resource set associated with the updated active quasi-co-location assumption corresponds to a highest priority of the priority order; and
    monitoring for downlink transmissions in at least a subset of the plurality of control resource sets based at least in part on the priority order and a number of active quasi-co-location assumptions for the plurality of control resource sets exceeding a threshold number of active quasi-co-location assumptions for the UE based at least in part on the updated active quasi-co-location assumption.

2. The method of claim 1, further comprising:
    transmitting, to a base station, a random access preamble message indicating a downlink beam for the control resource set of the plurality of control resource sets, wherein the updated active quasi-co-location assumption for the control resource set is based at least in part on the indicated downlink beam.

3. The method of claim 1, wherein monitoring for the downlink transmissions further comprises:
    monitoring for the downlink transmissions in a first subset of the plurality of control resource sets, wherein a number of active quasi-co-location assumptions for the first subset of the plurality of control resource sets is less than or equal to the threshold number of active quasi-co-location assumptions for the UE; and
    suppressing monitoring for a second subset of the plurality of control resource sets, wherein the second subset of the plurality of control resource sets corresponds to a set of lower priorities of the priority order than the first subset of the plurality of control resource sets.

4. The method of claim 1, wherein monitoring for the downlink transmissions further comprises:
    monitoring for the downlink transmissions in a first subset of the plurality of control resource sets, wherein a number of active quasi-co-location assumptions for the first subset of the plurality of control resource sets is less than or equal to the threshold number of active quasi-co-location assumptions for the UE;

modifying active quasi-co-location assumptions for a second subset of the plurality of control resource sets, wherein the second subset of the plurality of control resource sets corresponds to a set of lower priorities of the priority order than the first subset of the plurality of control resource sets, and wherein the modified active quasi-co-location assumptions comprise active quasi-co-location assumptions for the first subset of the plurality of control resource sets; and monitoring for the downlink transmissions in the second subset of the plurality of control resource sets according to the modified active quasi-co-location assumptions.

5. The method of claim 1, wherein the plurality of control resource sets comprises the control resource set associated with the updated active quasi-co-location assumption and a plurality of additional control resource sets.

6. The method of claim 5, wherein determining the priority order for monitoring further comprises:
determining the priority order for monitoring the plurality of additional control resource sets based at least in part on a control resource set identifier value for each control resource set of the plurality of additional control resource sets.

7. The method of claim 5, wherein determining the priority order for monitoring further comprises:
determining the priority order for monitoring the plurality of additional control resource sets based at least in part on a monitoring period length for each control resource set of the plurality of additional control resource sets.

8. The method of claim 5, wherein determining the priority order for monitoring further comprises:
determining the priority order for monitoring the plurality of additional control resource sets based at least in part on a reference signal received power associated with each control resource set of the plurality of additional control resource sets.

9. The method of claim 5, wherein determining the priority order for monitoring further comprises:
determining the priority order for monitoring the plurality of additional control resource sets based at least in part on a type of search space associated with each control resource set of the plurality of additional control resource sets.

10. The method of claim 9, wherein the type of search space comprises either a common search space or a UE-specific search space.

11. The method of claim 5, wherein determining the priority order for monitoring further comprises:
determining the priority order for monitoring the plurality of additional control resource sets based at least in part on one or more search space identifiers associated with each control resource set of the plurality of additional control resource sets.

12. The method of claim 1, wherein the downlink transmissions comprise physical downlink control channel transmissions.

13. A method for wireless communication at a base station, comprising:
transmitting, to a user equipment (UE), a configuration for a plurality of control resource sets, wherein the configuration for the plurality of control resource sets comprises an updated active quasi-co-location assumption for a control resource set of the plurality of control resource sets;
determining a priority order for the UE monitoring the plurality of control resource sets, wherein the control resource set associated with the updated active quasi-co-location assumption corresponds to a highest priority of the priority order; and transmitting a downlink transmission in a search space of a control resource set for transmission according to an active quasi-co-location assumption for the control resource set for transmission, wherein the control resource set for transmission, the active quasi-co-location assumption for the control resource set for transmission, or both are based at least in part on the priority order and a number of active quasi-co-location assumptions for the plurality of control resource sets exceeding a threshold number of active quasi-co-location assumptions for the UE based at least in part on the updated active quasi-co-location assumption.

14. The method of claim 13, further comprising:
receiving, from the UE, a random access preamble message indicating a downlink beam for the control resource set associated with the updated active quasi-co-location assumption, wherein the updated active quasi-co-location assumption for the control resource set is based at least in part on the indicated downlink beam.

15. The method of claim 13, further comprising:
selecting the control resource set for transmission from a first subset of the plurality of control resource sets, wherein a number of active quasi-co-location assumptions for the first subset of the plurality of control resource sets is less than or equal to the threshold number of active quasi-co-location assumptions for the UE, and wherein the first subset of the plurality of control resource sets corresponds to a set of higher priorities of the priority order than a second subset of the plurality of control resource sets.

16. The method of claim 13, further comprising:
selecting the control resource set for transmission from either a first subset of the plurality of control resource sets or a second subset of the plurality of control resource sets, wherein a number of active quasi-co-location assumptions for the first subset of the plurality of control resource sets is less than or equal to the threshold number of active quasi-co-location assumptions for the UE, and wherein the first subset of the plurality of control resource sets corresponds to a set of higher priorities of the priority order than the second subset of the plurality of control resource sets.

17. The method of claim 16, wherein the control resource set for transmission is selected from the second subset of the plurality of control resource sets, the method further comprising:
modifying the active quasi-co-location assumption for the control resource set for transmission, wherein the modified active quasi-co-location assumption for the control resource set for transmission comprises an active quasi-co-location assumption for at least one control resource set of the first subset of the plurality of control resource sets.

18. The method of claim 13, wherein the plurality of control resource sets comprises the control resource set associated with the updated active quasi-co-location assumption and a plurality of additional control resource sets.

19. The method of claim 18, wherein determining the priority order for the UE monitoring further comprises:
determining the priority order for the UE monitoring the plurality of additional control resource sets based at least in part on a control resource set identifier value for each control resource set of the plurality of additional control resource sets, a monitoring period length for each control resource set of the plurality of additional control resource sets, a reference signal received power associated with each control resource set of the plurality of additional control resource sets, a type of search space associated with each control resource set of the plurality of additional control resource sets, one or more search space identifiers associated with each control resource set of the plurality of additional control resource sets, or a combination thereof.

20. The method of claim 13, wherein the downlink transmission comprises a physical downlink control channel transmission.

21. An apparatus for wireless communication at a user equipment (UE), comprising:
a processor;
memory in electronic communication with the processor; and
instructions stored in the memory and executable by the processor to cause the apparatus to:
identify a configuration for a plurality of control resource sets, wherein the configuration for the plurality of control resource sets comprises an updated active quasi-co-location assumption for a control resource set of the plurality of control resource sets;
determine a priority order for monitoring the plurality of control resource sets, wherein the control resource set associated with the updated active quasi-co-location assumption corresponds to a highest priority of the priority order; and
monitor for downlink transmissions in at least a subset of the plurality of control resource sets based at least in part on the priority order and a number of active quasi-co-location assumptions for the plurality of control resource sets exceeding a threshold number of active quasi-co-location assumptions for the UE based at least in part on the updated active quasi-co-location assumption.

22. The apparatus of claim 21, wherein the instructions are further executable by the processor to cause the apparatus to:
transmit, to a base station, a random access preamble message indicating a downlink beam for the control resource set of the plurality of control resource sets, wherein the updated active quasi-co-location assumption for the control resource set is based at least in part on the indicated downlink beam.

23. The apparatus of claim 21, wherein the instructions to monitor for the downlink transmissions further are executable by the processor to cause the apparatus to:
monitor for the downlink transmissions in a first subset of the plurality of control resource sets, wherein a number of active quasi-co-location assumptions for the first subset of the plurality of control resource sets is less than or equal to the threshold number of active quasi-co-location assumptions for the UE; and
suppress monitoring for a second subset of the plurality of control resource sets, wherein the second subset of the plurality of control resource sets corresponds to a set of lower priorities of the priority order than the first subset of the plurality of control resource sets.

24. The apparatus of claim 21, wherein the instructions to monitor for the downlink transmissions further are executable by the processor to cause the apparatus to:
monitor for the downlink transmissions in a first subset of the plurality of control resource sets, wherein a number of active quasi-co-location assumptions for the first subset of the plurality of control resource sets is less than or equal to the threshold number of active quasi-co-location assumptions for the UE;
modify active quasi-co-location assumptions for a second subset of the plurality of control resource sets, wherein the second subset of the plurality of control resource sets corresponds to a set of lower priorities of the priority order than the first subset of the plurality of control resource sets, and wherein the modified active quasi-co-location assumptions comprise active quasi-co-location assumptions for the first subset of the plurality of control resource sets; and
monitor for the downlink transmissions in the second subset of the plurality of control resource sets according to the modified active quasi-co-location assumptions.

25. The apparatus of claim 21, wherein the plurality of control resource sets comprises the control resource set associated with the updated active quasi-co-location assumption and a plurality of additional control resource sets.

26. An apparatus for wireless communication at a base station, comprising:
a processor;
memory in electronic communication with the processor; and
instructions stored in the memory and executable by the processor to cause the apparatus to:
transmit, to a user equipment (UE), a configuration for a plurality of control resource sets, wherein the configuration for the plurality of control resource sets comprises an updated active quasi-co-location assumption for a control resource set of the plurality of control resource sets;
determine a priority order for the UE monitoring the plurality of control resource sets, wherein the control resource set associated with the updated active quasi-co-location assumption corresponds to a highest priority of the priority order; and
transmit a downlink transmission in a search space of a control resource set for transmission according to an active quasi-co-location assumption for the control resource set for transmission, wherein the control resource set for transmission, the active quasi-co-location assumption for the control resource set for transmission, or both are based at least in part on the priority order and a number of active quasi-co-location assumptions for the plurality of control resource sets exceeding a threshold number of active quasi-co-location assumptions for the UE based at least in part on the updated active quasi-co-location assumption.

27. The apparatus of claim 26, wherein the instructions are further executable by the processor to cause the apparatus to:
receive, from the UE, a random access preamble message indicating a downlink beam for the control resource set associated with the updated active quasi-co-location assumption, wherein the updated active quasi-co-location assumption for the control resource set is based at least in part on the indicated downlink beam.

28. The apparatus of claim 26, wherein the instructions are further executable by the processor to cause the apparatus to:
select the control resource set for transmission from a first subset of the plurality of control resource sets, wherein a number of active quasi-co-location assumptions for the first subset of the plurality of control resource sets is less than or equal to the threshold number of active quasi-co-location assumptions for the UE, and wherein the first subset of the plurality of control resource sets corresponds to a set of higher priorities of the priority order than a second subset of the plurality of control resource sets.

29. The apparatus of claim 26, wherein the instructions are further executable by the processor to cause the apparatus to:
    select the control resource set for transmission from either a first subset of the plurality of control resource sets or a second subset of the plurality of control resource sets, wherein a number of active quasi-co-location assumptions for the first subset of the plurality of control resource sets is less than or equal to the threshold number of active quasi-co-location assumptions for the UE, and wherein the first subset of the plurality of control resource sets corresponds to a set of higher priorities of the priority order than the second subset of the plurality of control resource sets.

30. The apparatus of claim 29, wherein the control resource set for transmission is selected from the second subset of the plurality of control resource sets, and the instructions are further executable by the processor to cause the apparatus to:
    modify the active quasi-co-location assumption for the control resource set for transmission, wherein the modified active quasi-co-location assumption for the control resource set for transmission comprises an active quasi-co-location assumption for at least one control resource set of the first subset of the plurality of control resource sets.

* * * * *